United States Patent [19]

Kinjo et al.

[11] Patent Number: 5,467,168
[45] Date of Patent: Nov. 14, 1995

[54] PHOTOGRAPH PRINTING METHOD

[75] Inventors: Naoto Kinjo; Takaaki Terashita, both of Kanagawa, Japan

[73] Assignee: Fuji Photo Film Co., Ltd., Kanagawa, Japan

[21] Appl. No.: 154,092

[22] Filed: Nov. 18, 1993

[30] Foreign Application Priority Data

Nov. 18, 1992 [JP] Japan .................................. 4-308962
Jan. 11, 1993 [JP] Japan .................................. 5-002454

[51] Int. Cl.⁶ .............................................. G03B 17/24
[52] U.S. Cl. ............................. 355/77; 355/40; 355/41; 355/42
[58] Field of Search ................................. 355/40, 41, 42, 355/77

[56] References Cited

U.S. PATENT DOCUMENTS

| | | | |
|---|---|---|---|
| Re. 34,362 | 8/1993 | Klosterhuber et al. | 355/40 |
| 4,646,252 | 2/1987 | Terashita . | |
| 4,933,711 | 6/1990 | Gudmundson et al. | 355/40 |
| 4,965,626 | 10/1990 | Robison et al. | 355/40 |
| 4,974,096 | 11/1990 | Wash | 355 X/40 |
| 4,975,732 | 12/1990 | Robison et al. | 355/40 |
| 4,975,736 | 12/1990 | Kito et al. | 355/77 |
| 5,025,283 | 6/1991 | Robison | 355/40 |
| 5,130,745 | 7/1992 | Cloutier et al. | 355/40 |
| 5,168,303 | 12/1992 | Ikenoue et al. . | |
| 5,223,892 | 6/1993 | Ikenoue et al. . | |
| 5,229,810 | 7/1993 | Cloutier et al. | 355/40 |
| 5,319,401 | 6/1994 | Hicks | 355 X/40 |

Primary Examiner—Michael L. Gellner
Assistant Examiner—Daniel P. Malley
Attorney, Agent, or Firm—Sughrue, Mion, Zinn, Macpeak & Seas

[57] ABSTRACT

A photograph printing method for printing on a photographic printing paper a plural number of images which are photographed on a film, the method comprising steps of detecting photographing information of the film, determining frames of the film including the images having equal or similar photographing conditions each other by use of the photographing information, and determining equal or similar amount of print conditions corresponding to the same or similar photographing conditions of the frames thus determined, and printing the images by use of the equal or similar amount of print conditions thus determined.

12 Claims, 10 Drawing Sheets

PHOTOGRAPH PRINTING METHOD

BACKGROUND OF THE INVENTION

The present invention relates to a photograph printing method for printing on a photograph printing paper a plural number of frames on a film recorded images by a camera.

An auto printer, which automatically prints images recorded on a film on a photograph printing paper, measures separately an amount of light from each frame of a film, and calculates an integral transmission density of the entire surface of each frame on the basis of the results of this measurement. The printer applies correction processes, such as the slope control and the color correction (color control), based on the difference between the integral transmission density and a reference density ( the density of a called typical negative). The quantity of the print exposure (referred frequently to as a print exposure quantity) is determined every image. The printer prints the images of the frames on a photograph printing paper at the determined print exposure quantity. The resultant prints are proper in density and well color balanced since a variation of exposures and color failures, which would take place in the stage of photographing, are corrected through the above process. The average value of integral transmission density values of a number of images may be often used as the reference density. On the other hand, an image average density may be used instead of the integral transmission density.

When comparatively observing the images formed by taking photographs of similar scenes plural times by a camera, it is seen that the densities, colors, and the like of the major subjects are little changed, but differences are often observed in the relative areas of the background in the images because of different compositions of the scenes. The change of the relative area of background results in change of the average density and the color balance of the entire image. The auto printer determines the exposure conditions on the basis of the average density of the image surface. Accordingly, in the prints of the images of similar scenes produced by the auto printer, the densities and the color balance of major subjects are greatly influenced by the changed relative area of background and so change. The nonuniform finishing of the prints of the images of the same scenes gives a user a feeling of mental difference.

Solutions of this problem have been proposed in Published Unexamined Japanese Patent Application Nos. Sho. 54-26729, 56-153334, 63-80242, 63-80244, and the like. In those proposed techniques, an image is divided into a number of segmental areas. The intensity of light from the segmental areas are measured. Comparison is made of the density values (e.g., average values, maximum values, and minimum values) of the image areas (e.g., central area and peripheral area), the ratios of the bright and dark areas, color distributions, and the like. If the two images compared are similar in the density values, the area ratios, and the color distributions, it is assumed that the images are formed by taking photograph of the same scene. Those images are printed under the equal or similar printing conditions.

In some types of cameras, an optimum exposure is automatically determined by a called multiple photometric method (also called a division photometric method, an evaluation photometric method, a multi-pattern photometric method or a multi photometric method) in which different areas on a subject to be photographed are measured the amount of light by using a plural number of photometric elements. Many and various technical improvements have been actively made in those cameras (Published Unexamined Japanese Patent Application Nos. Sho. 57-42026, and Hei. 1-280737 and 2-84628).

When the density values, the area ratios, and the color distributions are greatly different between the compared images, the proposed technique fails to make the assumption that the images are formed by taking photographs of similar scenes. It is difficult to produce the prints finished such that the major subjects of the images are substantially equal.

In the images formed by taking photograph of similar scenes, it is not seldom that the density values, the area ratios, and the color distributions are greatly different. When an image formed by taking photograph of a scene by an auto focus camera after the focus lock without changing its composition is compared with an image formed by taking photographs of the same scene after the composition is changed, the density value and the ratio of the bright and dark areas are greatly different between those images. Where the stroboscopic light is used for photographing a scene, when the composition of the scene is slightly changed, a portion in the image where a maximum density is present changes. Thus, when using the conventional technique, it is difficult to print the film images of the same scene so as to be uniform in their finishing.

Further when a film bearing images photographed by the camera of the type in which the quantity of exposure light is automatically determined is set to the auto printer and printed, since the print exposure quantities for the frames are determined on the basis of the integral transmission density values of the images, the print exposure quantities, excessively corrected are set up for the frames with less varied exposures, so that the print of improper density is frequently formed. Particularly in the camera of the type in which the exposure control is locked when the camera is focused on the major subject, the image is photographed at the exposure set for the major subject. Accordingly, a small quantity of correction is required for the nonuniformity of the exposure. However, the auto printer is incapable of discriminating the major subject. The printer obtains the print exposure quantity on the basis of the integral transmission density in a manner as described above. The integral transmission density is influenced by a density of the background. Where the background density is high, the exposure is determined to be overexposure. An excessive correction is made so as to increase the print exposure quantity. As a result, the density of the major subject of the finished print is higher than an expected one.

To cope with the problem, the Applicant of the present Patent Application proposed the invention comprising the steps of measuring light intensity of a plural number of frames, obtaining a print exposure quantity on the basis of the results of the measuring step, and printing the frames on a printing paper at the thus obtained print exposure quantity (in Japanese Patent Application Hei. No. 3-88456).

The invention of Japanese Patent Application No. Hei. 3-88456 succeeds in solving the above problem, and can produce prints of proper density at higher probability than the conventional technique. From the subsequent study of the inventors of the present Patent Application, it is found that in the invention of Japanese Patent Application No. Hei 3-88456, the print colors are influenced by various parameters, such as film type, film nonuniformity caused in the manufacturing stage, photographing light source, film aging, film characteristics caused by the storage of films, development nonuniformity, and the like. The prints of poor color control (color NG print) are formed at higher probability than by the conventional technique.

SUMMARY OF THE INVENTION

The present invention has been made in view of the above circumstances and has an object to provide a photograph printing method which produces the prints of images photographed by a camera, which have proper density values and are well color controlled.

To achieve the above object, there is provided with a photograph printing method of first aspect of the invention, printing on a photograph printing paper a plural number of images which are photographed by a camera on a film under the photographing conditions of the photographed frames being recorded as photographing information in a recording portion, wherein the photographing information is read out of the recording portion, and the images photographed under the equal or similar photographing conditions are printed under the equal or similar printing conditions, on the basis of the readout photographing information.

A photograph printing method of second aspect of the invention is provided, which prints on a photograph printing paper a plural number of images which are photographed by a camera on a film under the photographing conditions of the photographed frames being recorded as photographing information in a recording portion, a plural number of photographing information patterns indicative of standard photographing conditions of the photographed frames are set up, wherein the photographing information is read out of the recording portion, and the images photographed under the equal or similar photographing conditions indicated by any of the photographing information patterns are printed under the equal or similar printing conditions, on the basis of the plural number of photographing information patterns and the readout photographing information of the frames.

In the photograph printing method of 1 or 2 aspect of the invention, the photographing information includes at least one of the following items; photographing time, the luminance value obtained when different areas on a subject are measured to determine an exposure, magnification, distance to the subject, subject in-focus position, stop, shutter speed, and use of stroboscopic light; those items being numerically expressed, and it is determined that the photographing conditions of two compared images are equal or similar to each other, when a similarity coefficient of the photographic conditions of the compared images which is calculated in a manner that the square of the difference between the corresponding items is multiplied by a weighting factor predetermined every item, and the thus obtained products of all of the items are summed, is equal to or smaller than a predetermined value.

In the photograph printing method of any of the above aspects of the invention, when, of those items of photographing information, a specific item is not recorded in the film, or when an instruction to remove the specific item from the factors for making a decision on the resemblance of the photographing conditions is given, the weighting factor for the specific item is set to 0 when calculating the similarity coefficient.

In the photograph printing method according to any of the above aspects, the plural number of images photographed under the equal or similar photographing conditions are printed under an average printing condition obtained by measuring the intensity of the plural number of images, or printing conditions formed by modifying the printing conditions, which are obtained every image by measuring luminous quantities of the plural number of images, by the average printing condition.

In a photograph printing method of third aspect of the invention, a plural number of images, photographed on a film by a camera capable of automatically determining an exposure, are printed on a photograph printing paper at a print exposure quantity, wherein a photometric measurement of each frame of the film is separately measured in a number of segmental areas of each frame, the print exposure quantity being determined on the basis of a print density adjustment exposure quantity in common to the plural number of frames, which is based on the results of the photometry, and on the basis of a color balance adjustment exposure quantity determined every frame on the basis of the photometry.

In a photograph printing method of fourth aspect of the invention, a plural number of images, photographed on a film by a camera, are printed on a photograph printing paper at a print exposure quantity, which is determined on the basis of a print density adjustment exposure quantity of a predetermined frame of those belonging to a group consisting of the frames photographed under the similar photographing conditions, or a print density adjustment exposure quantity Based on the average value of the print density adjustment exposure quantities of a plural number of frames of those belonging to a group of frames photographed under the similar photographing conditions, and a color balance adjustment exposure quantity, which is determined every frame on the basis of the photometry of the frames.

In the photograph printing method, the specific frame or the plurality of frames are preferably selected on the basis of the camera information recorded on recording medium corresponding to every frame, or selected on the basis of the frames or a frame image displayed on a display screen of an image display device.

In the photograph printing method, the print density determining exposure quantity determined for the predetermined frame or the average value of the print density adjustment exposure quantities determined for a plural number of frames of those belonging to a group of frames may be corrected on the basis of the presumed exposure accuracy of a camera used.

In a photograph printing method of fifth aspect of the invention, a plural number of images photographed on a film by a camera capable of automatically determining an exposure are printed on a photograph printing paper at a print exposure quantity, wherein a photometric measurement of each frame of the film is separately measured in a number of segmental areas of each frame, at least one image which is same as the image on the photograph printing paper at an even print exposure quantity that is determined on the basis of the results of the photometric measurement is displayed on a display screen of a display device, the displayed image is confirmed and corrected so as to determine a corrected exposure quantity of the displayed image, and an actual print exposure quantity of the frame is determined on the basis on the even print exposure quantity and the correct print exposure quantity.

In the first aspect of the invention, photographing information indicating the photographing conditions of the photographed images is read out of the recording portion, and the images photographed under the equal or similar photographing conditions are printed under the equal or similar printing conditions, on the basis of the readout photographing information. The photographing information includes at least one of the following items; photographing time, the luminance value obtained when different areas on a subject are measured to determine an exposure, magnification, distance to a subject, subject in-focus position, stop, shutter speed, and use of stroboscopic. The recording portion may be formed in the film or another member or location.

When comparing the photographing conditions of a plural number of images formed by successively photographing plural times a scene, the photographing conditions, such as the luminance value obtained when different areas on a subject are measured to determine an exposure, magnification, distance to a subject, subject in-focus position, stop, and shutter speed, are substantially equal when the photographing times are close to each other and even if the compositions of the scene are slightly different from each other. For example, when a camera of the type which has the AE and auto focus functions and determines an exposure by the called multi-pattern photometric method is used, when a scene is successively photographed so as to change its composition by the camera in a state of the focus being locked, the luminance values on the areas on the subject are extremely close to each other.

Therefore, it can be decided that the images photographed under the equal or similar photographing conditions, i.e., the images of which the photographing information representative of the photographing conditions are equal or similar, are formed by photographing similar scenes. The decision on the same/similar-scene images based on the photographing conditions is more exact than that based on the density values, the dark/bright area ratio, the color measurement and the like. With regard to the determination for the same/similar-scene images, e.g. it is determined that the photographing conditions of two compared images are equal or similar when a similarity coefficient for the photographic conditions of the compared images, which is calculated by summing the products of multiplying the square of the difference between the corresponding items by a weighting factor predetermined for each item, is equal to or smaller than a predetermined value.

In the present invention, the images photographed under the equal or similar photographing conditions are printed at the equal or similar printing conditions on the basis of the photographing information indicating the photographing conditions. Accordingly, the images of similar scenes are handled as the images photographed under the equal or similar photographing conditions even if the compositions of the scenes are different when photographed. Those images are printed under the equal or similar printing conditions so that, the densities, colors, and the like of major subjects are substantially equal. Thus, the photograph printing method of the invention may perform printing the photographed images of similar scenes so as to be substantially uniform in their finishing.

The printing conditions for the images of similar scenes which are photographed by the stroboscopic light are different from those for those images photographed not using the stroboscope. To cope with this, the photographing information further contains information as to whether or not the stroboscope is used. The information indicative of use of the stroboscope, which is additionally contained in the photographing information, reflects on the similarity coefficient value. The equal or similar printing conditions will be not used for printing the images photographed using the stroboscope and the images not using the stroboscope.

In the photograph printing method of the second aspect of the invention, a plural number of photographing information patterns indicative of standard photographing conditions of the photographed frames are predetermined, photographing information is read out of the recording portion, and the images photographed under the equal or similar photographing conditions indicated by any of the photographing information patterns are printed under the equal or similar printing conditions, on the basis of the plural number of photographing information patterns and the readout photographing information of the frames. Accordingly, the photograph printing method of this invention can also print the photographed images of similar scenes so as to be substantially uniform in their finishing as the first aspect of the invention. To make the decision on the photographing conditions similar to those represented by the photographing information pattern in the second aspect of the invention, the similarity coefficient is calculated on the photographing information of the images and the photographing information pattern, as in the previous invention.

All of the items of the photographing information are not always recorded. The camera not having the auto focus function cannot detect distance to a subject and the subject in-focus position. The camera not having the function to determine an exposure by the multi-pattern photometric method, that is, the AE function, cannot detect the luminance value. Thus, the number of items of the photographing information that are recorded depends on the type of the camera used.

Further, when, of those items of photographing information, a specific item is not recorded in the film, the weighting factor for the specific item is preferably set to 0 when calculating the similarity coefficient. With this, the similarity coefficient is obtained in accordance with the items stored in the film. When the photograph printer incorporating the present invention successively prints the images of a plural number of films that are photographed using different types of cameras, the printer can readily calculate the similarity coefficients in accordance with the type of cameras. Additionally, also when an instruction to remove the specific item from the factors for making a determination on the resemblance of the photographing conditions is given, the weighting factor for the specific item may be set to 0 when calculating the similarity coefficient.

In a photograph printing method of the third aspect of the invention, a plural number of images, photographed on e.g. a single film by a camera capable of automatically determining an exposure, are printed on a photograph printing paper at a print exposure quantity which is determined on the basis of a print density adjustment exposure quantity (e.g., an exposure quantity determined depending on the average density of a plural number of frames) which is common to the plural number of images based on the results of separate photometric measurement, and on the basis of a color balance adjustment exposure quantity determined every frame on the basis of the photometric values of the frames. When using the camera capable of automatically determining an exposure, the images are photographed highly probably at a proper density, so that the thus photographed images are little varied in exposure. Since the print density adjustment exposure quantity, valid for all of the plural number of frames photographed on a single film, is used as an example, the values of the print exposure quantity depends on the varied exposures of the cameras and/or the varied sensitivity every film. The color balance adjustment exposure quantity is determined every frame on the basis of the results of photometric measurement of the frames, e.g., the average density of each color in each frame. For various parameter, such as film type, film nonuniformity caused in the manufacturing stage, photographing light source, film aging, film characteristics caused by the storage of films, development nonuniformity, and the like, the color balance adjustment exposure quantity is determined so as to correct these parameters. Accordingly, the frames are satisfactorily color controlled. Further, since the print exposure quantity is determined on the basis of the print density adjustment exposure quantity and the color balance adjustment exposure quantity, it depends on the varied exposures of the cameras and the varied sensitivities of the films, and includes the color balance of each frame as a factor to determine the print exposure quantity per se. Accordingly, the well color balanced (well color reproduced) prints of proper density values are produced at a high probability when the frame images of the film are printed at the print exposure quantity.

In the photograph printing method of fourth aspect of the invention, a print exposure quantity is determined on the basis of at least one of, a print density adjustment exposure quantity for a predetermined frame of those belonging to a group consisting of the frames photographed under the same photographing conditions (the frames of one scene where the major subject density values are similar), and an average value of the print density adjustment exposure quantities of a plural number of frames of those belonging to the group, and on the basis of a color balance adjustment exposure quantity which is determined every frame on the basis of the photometric values of the frames. With such a construction, the print density adjustment exposure quantity of a predetermined frame of those belonging to a group consisting of the frames of one scene, which are photographed on a single film, or another print density adjustment exposure quantity based on the average value of the print density adjustment exposure quantities of a plural number of frames of those belonging to a group of frames is used. The print density adjustment exposure quantity depends on the varied exposures of the cameras and the varied sensitivities of the films, and is more appropriate than that in the case where the fames are not grouped. The color balance adjustment exposure quantity is determined every frame on the basis of the results of photometric measurement of the frames, e.g., the average density of each color in each frame. For various parameters, such as film type, film nonuniformity caused in the manufacturing stage, photographing light source, film aging, and the like, the color balance adjustment exposure quantity is determined so as to correct these parameters. Accordingly, the frames are satisfactorily color controlled. The print exposure quantity depends on the varied exposures of the cameras and the varied sensitivities of the films. Further, the color balance of each frame is contained as a factor to determine that print exposure quantity. The features of the same scene also serve as a factor to determine that print exposure quantity. When the frames of the film are printed at the print exposure quantity thus determined, the prints most of which are well color balanced and proper in density can be produced for each group. Particularly in the camera of the type in which the exposure is determined mainly for a subject at which the camera is focused, the images are photographed at the exposure set for the major subject. The quantity of correction for the variation of exposures is further reduced. Accordingly, the prints which are well color balanced and proper in density can be produced at further higher probability. The present invention is also applicable for a camera of the type incapable of automatically determining the exposure in a manner that the features of each frame are obtained using the results of divided photometric measurement of a number of segmental areas of each frame, and the frames are arranged into groups consisting of the frames having the same photographing conditions.

In the photograph printing method of fourth aspect of the invention, when the predetermined frame or the plurality of frames belonging to one group are selected on the basis of the camera information recorded on recording medium provided in association with the frames, it is possible to reliably select the predetermined frame or the plurality of frames grouped in accordance with the camera information, such as luminance of a predetermined field region, photographing light source, such as stroboscope or daylight, time zones the frames are photographed, seasons, or photographing magnification.

When the predetermined frame or the plurality of frames belonging to one group are selected on the basis of a frame image displayed on a display screen of an image display device, it is possible to reliably select the predetermined frame or the plurality of frames grouped every scene, by watching the displayed image.

The print density determining exposure quantity determined for the predetermined frame or the average value of the print density adjustment exposure quantities determined for a plural number of frames of those belonging to a group of frames may be corrected on the basis of the presumed exposure accuracy of a camera used. The prints which are well color balanced and proper in density can be produced at further higher probability in a manner that a quantity of correction of the print exposure quantity is obtained, and the exposure accuracy of the camera is presumed on the basis of the obtained quantity of correction of the print exposure quantity, and a print density adjustment exposure quantity is corrected in accordance with the presumed exposure accuracy.

In a photograph printing method of fifth aspect of the invention, at least one image, which corresponds to same as a print formed by printing each of a plural number of images, which are photographed on a film by a camera capable of automatically determining an exposure, on a photograph printing paper at a print exposure quantity that is determined on the basis of the results of divided photometric measurement of a number of segmental areas of each frame, is displayed on the display screen of a display device. The displayed image is confirmed and corrected to determine a corrected exposure quantity of the displayed image. A print exposure quantity of the frame corresponding to the displayed image is determined on the same print exposure quantity for the plural number of frames and the corrected exposure quantity. In an exemplar method to determine the print exposure quantity of the frames on the basis of the same print exposure quantity for the plural number of frames and the corrected exposure quantity, either of the corrected exposure quantity set for one of the corrected frames or the average value of the corrected exposure quantities set for a plural number of the corrected frames, or a weighted mean value of either of the corrected exposure quantity or the average value of the corrected exposure quantities and a predetermined corrected exposure quantity (e.g., an average corrected exposure quantity of a number of films grouped every camera type or film type), is used for correcting the plurality of frames of the film including the corrected frame, whereby determining the print exposure quantity for the remaining frames. As a result, the print exposure quantity can be quickly and exactly corrected in accordance with camera type, film type, development, film aging and the like. It is possible to substantially determine the exposure quantity in optimum. Accordingly, the well color balanced (well color reproduced) prints of proper density values are produced at a high probability when the frame images of the film are printed at the thus determined print exposure quantity.

DETAILED DESCRIPTION OF THE PREFERRED EMBODIMENTS

Figure 1:
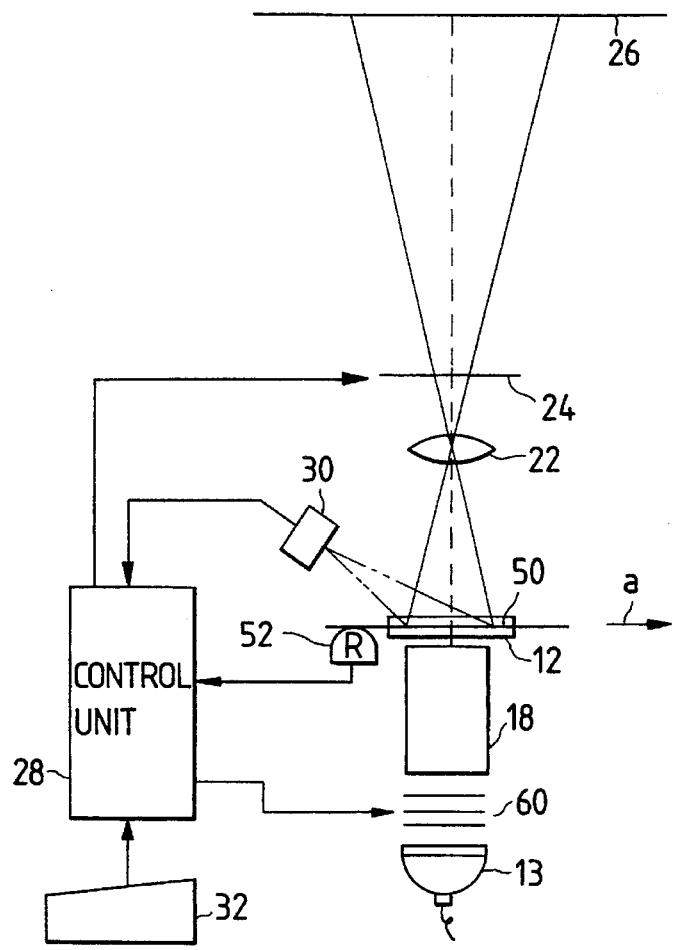
FIG. 1 is a schematic diagram showing a printer according to the first embodiment of the present invention.
Figure 2:
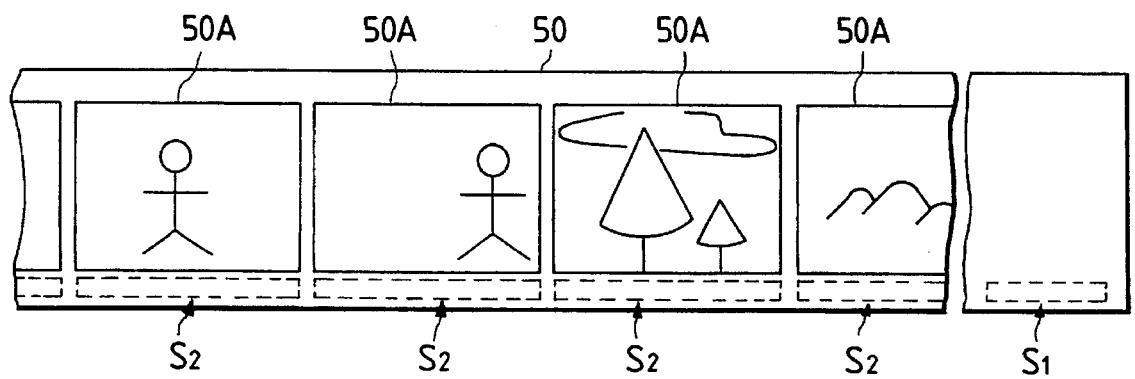
FIG. 2 is a plan view showing a negative film according to the first embodiment.
Figure 3:
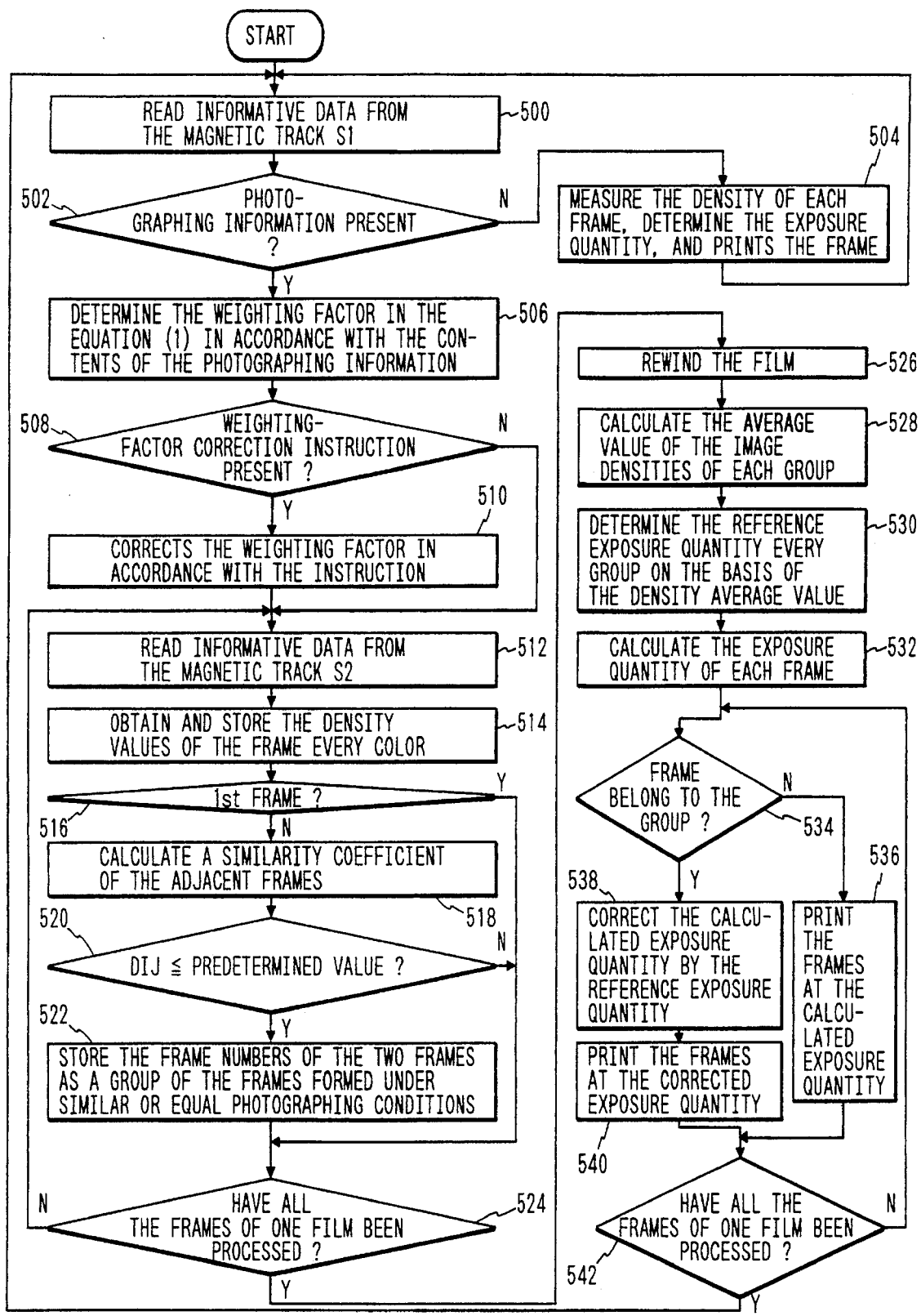
FIG. 3 is a flow chart showing the operation of a first embodiment of the present invention.

The first embodiment of the present invention will be described with respect to FIGS. 1 through 3. In FIG. 1, there is shown a printer to which the present invention is applicable.

A number of negative films 50 bearing a plural number of frames 50A, photographed by a camera (not shown), is set to the printer after the negative films 50 are bonded together by splicing tape, for example, and subjected to a series of processes, development, bleaching, fixing, washing, and drying. Each negative film 50 is designed such that the side opposite to the sensitive side of the film is coated with magnetic material, not shown. A magnetic track S1 on which data can be recorded is formed on the leading part of the film 50. Magnetic tracks S2 are likewise formed on the frames 50A of the film.

A camera capable of magnetically recording data in the magnetic tracks S1 and S2 and another type of camera not having such a data recording capability are used for photographing images on the negative films 50. When an image is photographed using the camera with the data recording function, predetermined information including photographing information indicative of the photographing conditions are recorded into positions of the magnetic track S2 corresponding to the frames of the photographed images. The photographing information includes the following items; photographing time, the luminance value obtained when different areas on a subject are measured to determine an exposure, magnification, distance to a subject, subject in-focus position, stop, shutter speed, and use of stroboscopic light. The camera detects the items when photographing the image, and records the items in the form of numerical values in the magnetic track S2 (for example, use of stroboscope=1 and nonuse of stroboscope=0).

The number of the items of the photographing information to be recorded in the film 50 depends on the function of the camera used. The items of the distance to a subject and the subject in-focus position are detected and recorded in the magnetic track S2 only when the camera used is of the AF type which measures a photographing distance (between the lens and a subject) by the distance measuring element and automatically brings the subject into focus. The item of the luminance value of the subject, for example, is detected and recorded in the magnetic track S2 only when the camera used is of the AE type which determines an exposure by measuring the intensity of different segmental areas on the subject by means of photometric measuring elements, that is, by the called multi-pattern photometric method.

The AE function may be any of the stop first AE, the shutter-speed first AE and the program AE. For the cameras with the AE function and the AF function, they are of the AE lock type in which exposure is automatically determined and locked when the camera is in a focus lock mode.

As shown in FIG. 1, the printer 10 includes a negative carrier 12 for transporting the negative film 50 to the printing section. Disposed under the negative carrier 12 are a mirror box 18 and a lamp house 13 with a halogen lamp, not shown. A lighting control filters 60 are disposed between the mirror box 18 and the lamp house 13. The lighting control filter 60, as well known, consists of three color correction filters, a C filter, a M filter and a Y filter.

Disposed above the negative carrier 12 are a lens 22, a black shutter 24 and a photograph printing paper 26 in this order. Rays of light are emitted from the lamp house 13 and pass through the lighting control filter 60, the mirror box 17 and the negative film 50, and are focused on the printing paper 26 by means of the lens 22.

A two-dimensional image sensor 30, slanted with respect to the optical axis of the imaging optical system, is disposed at a location near the optical axis. The two-dimensional image sensor 30 measures photometrically separately a number of segmental areas of the negative image of the frame 50A, which is set at the printing position, and measures the density at each area for each of the primary colors R (red), G (green) and B (blue).

A magnetic head 52 is disposed upstream of the negative carrier 12, in association with the magnetic tracks S1 and S2. The two-dimensional image sensor 30 and the head 52 are connected to a control unit 28 including a micro-computer and related circuitry for controlling the printer. The control unit 28 is connected to a keyboard 32 for entering commands, data or the like. The control unit 28 is connected through drivers (not shown) to the lighting control filter 60 and the black shutter 24. The filter and the shutter are controlled by the control unit 28.

The operation of the first embodiment as mentioned above will be described with reference to FIG. 3. The flow chart of FIG. 3 will run when the negative film 50 is set to the printer 10 and a start instruction of the print process is entered.

In a step 500, the negative film 50 is transported, and the head reads every film information from the magnetic track S1 of the negative film 50 to be printed. In a step 502, it is determined whether or not information including photographing information is recorded in the magnetic track S2, on the basis of the readout information of each film 50.

The answer NO is determined when the images of the negative film 50 set to the printer are photographed by a camera not having the data recording function, such as a called film with a lens. In the case of the camera not having the data recording function, information cannot be recorded in the magnetic track S1. For the images of the film photographed by this camera, the step 502 can be executed if in the stage of manufacturing the negative film 50, necessary information is previously recorded in the magnetic track S1 of the film. In a case where this film having the necessary information previously recorded in the magnetic track S1 is used for the camera having the data recording function, the step 502 can also be executed if the photographing information is written over the necessary information already recorded in the magnetic track S1.

If the answer to the step 502 is NO, the normal printing process, in a step 504, is carried out for the frames 50A of one film in the order from the first frame to the last frame, successively. The printing process consists of the step of positioning each frame 50A at the printing position, measuring the density of the image, determining the print exposure quantity at the measured density value, and printing the frame on the printing paper 26 at the determined print exposure quantity. Upon completion of the printing process, the operation returns to the step 500.

If the answer to the step 502 is YES, a step 506 is executed. In this step, the items recorded in the magnetic track S2 are recognized from items indicating the photographing information on the basis of the information representative of the type of camera in the information which is read from the magnetic track S1. Then, the weighting factor (Ap: p=1 to m) to be applied to each item in an equation for similarity coefficient (equation (1)) to be given later is determined. In this case, for the items not recorded in the magnetic track S2, the weighting factor is set to "0", and for the items recorded therein the weighting factor is set to a predetermined value larger than "0".

In a step 508, it is determined if an instruction for correcting the weighting factor is entered. When an operator strikes the keyboard 32 to enter the correcting instruction for the weighting factor, the weighting factor is corrected in accordance with the instruction entered in a step 510, and a step 512 is executed. If the answer to the step 508 is NO, the operation jumps to a step 512 without executing a step 510.

In the step 512, the negative film 50 is transported, and the photographing information and the like are read out of single magnetic track S2, and the readout information is stored into a memory of the control unit 28. At the same time, the frame 50A associated with the magnetic track S2 from which the information is read is set at the printing position. In the next step 514, the two-dimensional image sensor 30 measures photometrically the positioned frame 50A, and obtains the density values at the respective areas of the image for each of the colors R, G and B. Alternatively, the average density of the major portion of the image may be obtained. The major portion of the image may be the central area where the major subject is present highly probably or the focus area.

In the next step 516, it is determined whether or not the frame 50A, subjected to the process of reading photographing information and measuring the density, is the first frame of the negative film 50. If the answer to the step 516 is YES, a step 524 is executed. In this step, it is determined whether or not the process of all of the images recorded in one film is completed. If the answer to the step 524 is NO, the operation returns to the step 512, and repeats the sequence of the steps 512 to 524 until the answer to the step 524 is YES.

After the second and subsequent frames 50A are subjected to the process of reading photographing information and of measuring the density in the steps 512 and 514, the answer to the step 516 is NO, and a step 518 is executed. In this step, it is determined whether or not the photographing information of the i-th frame processed in the step 516 are equal or similar to those of the next or (i−1)th frame 50A. To this end, a similarity coefficient $G_{hj}$ of each frame is calculated. The similarity coefficient $G_{hj}$ between the i-th frame and (i−1)th frame is given by the next equation (1)

$$G_{hj} = \sum_{P=1}^{m} (A_p \times (X_{pi} - X_{p(i-1)})) \quad (1)$$

where p: number assigned to each item of the photographing information $A_p$: weighting factor applied to each item p $X_{pi}$: information corresponding to the item p of the i-th frame $X_{p(i-1)}$: information corresponding to the item p of the (i−1)th frame.

The value determined in the step 506 (or the value corrected in the step 510) is used for the weighting factor Ap. As seen from the equation (1), the similarity coefficient $G_{hj}$ is calculated, with respect to the information of two image frames to be compared regarding same and similar photographing condition or not, in a manner that the square of the difference value between the corresponding item of each image whose similarity is to be compared each other, is multiplied by a predetermined weighting factor for every item, and the thus obtained products of the first to i-th items are summed. Accordingly, the similarity coefficient $G_{hj}$ become gradually small in accordance with the item values or the photographing conditions are similar. For the items not recorded in the magnetic track S2, the weighting factor Ap is set to 0, as referred to above. Because of this, such an item does not affect the value of the similarity coefficient $G_{hj}$, and the similarity coefficients $G_{hj}$ of only those items recorded in the magnetic track S2 are calculated.

The proper print exposure quantity of the image photographed by the stroboscopic light is different from that of the image by the light other than the stroboscopic light even if the image is photographed under the equal or similar photographing conditions. However, this problem can be solved by setting the weighting factor Ap applied to the information of the item as to whether or not the stroboscope is used to a relatively large value. If so set, the similarity coefficient for the case of using the stroboscope is greatly different from that for the case of not using the stroboscope. The large similarity coefficient difference provides a distinctive discrimination of those cases.

The reason why the item value difference is squared is that the sign of the difference must be eliminated. In this sense, the equation (1) may be substituted by the next equation (2).

$$G_{hj} = \sum_{p=1}^{m} (A_p \times |X_{ph} - X_{pj}|) \quad (2)$$

The image density information (e.g., the average density of the entire image surface, density in the central area of the image, and the density in the peripheral area), obtained by measuring intensity of the frame 50A by the two-dimensional image sensor 30, may be involved in the equation (1) or (2).

In the next step 520, it is determined if the similarity coefficient is below a predetermined value. If the answer to the step 520 is YES, it is determined that the corresponding two frames are photographed under similar photographing conditions (same photographing conditions when the similarity coefficients are equal). In a step 522 the frame numbers of the two frames are stored so as to a group of the frames of the equal or similar photographing conditions, and a step 524 is executed. If one of the two frames belongs to another group, the frame number of that frame is stored so that it belongs to the same group. If the answer to the step 520 is NO, it is determined that the two frames are not similar, and the operation jumps a step 522 to a step 524.

The operation of the execution to the step 524 is continued for all of the frames 50A of the negative film 50 until the answer to the step 524 is YES. As a result, one or more groups of the frames formed under the equal or similar photographing conditions are formed. The frame numbers of the frames formed under the equal or similar photographing conditions are stored every group into the memory of the control unit 28. If the answer to the step 524 is YES, the operation goes to a step 526 to rewind the negative film 50 till the first frame is placed to outside.

In a step 528, the operation is executed a calculation of an average value Dkj (k: sign representing a group, and j: any of the colors R, G and B) of the density values of the grouped frames 50A every group, on the basis of the density values of the frames 50A stored in the memory. In accordance with the calculation, the average value of the density values is set up according to the photographing conditions in optimum, every group. In a step 530, a reference print exposure quantity using the density average values Dkj of the groups is determined in accordance with the next equation (3)

$$\log Ekj = K_{1j} + K_{2j}(Dkj - DN_j) + K_{3j} \quad (3)$$

where Ekj: reference print exposure quantity of the group k $DN_j$: density value of a reference negative film (called Bull's eye)

$K_{1j}$, $K_{2j}$: constants determined in accordance with the types of the printer, negative film 50, printing paper 26, and the developing performance of the printer $K_{3j}$: correction quantity used as required.

In a step 532, a print exposure quantity Eij is calculated for each frame 50A using the density value Dij of each frame 50A stored, in place of the density average value Dkj for each group in the equation (3).

The sequence of a step 534 and the subsequent ones carries out a process to print the images of the frames 50A on the printing paper 26. In the step 534 the control checks the group to which the frames 50A to be printed belong. This is carried out by checking as to whether or not the frame numbers are stored in the memory. If the frame number is not stored, it is determined that the frame does not belong to any group. In a step 536, the frame is set at the print position, and the lighting control filter 60 and the black shutter 24 is controlled so that the frame is printed on the printing paper 26 at the print exposure quantity Eij calculated in the step 532.

If the frame number is stored, it is determined that the frame belongs to any of the groups, and advances to a step 538. In this step, the print exposure quantity Eij calculated in the step 532 is corrected by use of the reference exposure quantity Ekj of the group to which the frame belongs, according to the following equation (4)

$$Eij' = f \times (Eij - Ekj) + Ekj \quad (4)$$

where $0 \leq f < 1.0$.

As seen from the equation (4), since coefficient f is smaller than 1.0, the exposure quantity Eij' after corrected corresponds to the exposure quantity obtained when the print exposure quantity Eij of each frame is corrected to be approximate to the reference exposure quantity Ekj of each group. If the coefficient f is set to 0, the exposure quantity Eij' is equal to the reference exposure quantity Ekj. In the next step 540, the frame is set to the printing position, and the lighting control filter 60 and the black shutter 24 are controlled so that the frame is printed on the printing paper 26 at the print exposure quantity Eij' corrected in the step 538.

After carrying out the step 536 or 540, a step 542 is executed. In this step, it is determined whether or not all of the frames of one film 50 have been printed. If the answer to the step 542 is NO, the operation returns to the step 534, and repeats the sequence of the steps 534 to 540 until all of the frames of one film 50 have been printed. If the answer to the step 542 is YES, the operation returns to the step 500, and repeats the above-mentioned sequence of the steps. The frames that are decided to be photographed under the equal or similar photographing conditions are printed on the printing paper 26 at the print exposure quantities that are close in value (equal print exposure quantity if f=0).

As described above, in the first embodiment, the photographing conditions of the frames are used for recognizing the group of the frames photographed under the equal or similar photographing conditions. The frames of similar scenes are contained in the group of the frames photographed under the equal or similar photographing conditions, at a high probability. The frames belonging to the group are printed at similar or equal print exposure quantity. Therefore, the frames of similar scenes can be printed at the substantially equal finishing quality.

In the embodiment described above, it is determined whether or not the photographing conditions of the frames are similar, on the calculated similarity coefficient of the adjacent (successive) frames 50A on the film. The frames, not successive, may be used in lieu of the successive ones, for the same purpose.

[Second Embodiment]

A second embodiment of the present invention will be described. Since the construction of the printer for the second embodiment is the same as that for the first embodiment, the description for the construction of the printer will be omitted. The similar elements with the first embodiment are identified by same numerals. In the second embodiment, a plural number of photographing condition patterns, which represent reference photographing conditions at the time of photographing, are preset. The patterns are stored in a nonvolatile memory, such as a ROM, in the control unit 28. The patterns are preset as typical values representing the photographing information under different photographing conditions, respectively, when a scene is photographed. Different photographing conditions are included for different types of light sources (e.g., natural light, fluorescent lamp, stroboscope and the like), different weather conditions, different colors of a subject, and the like.

Figure 4:
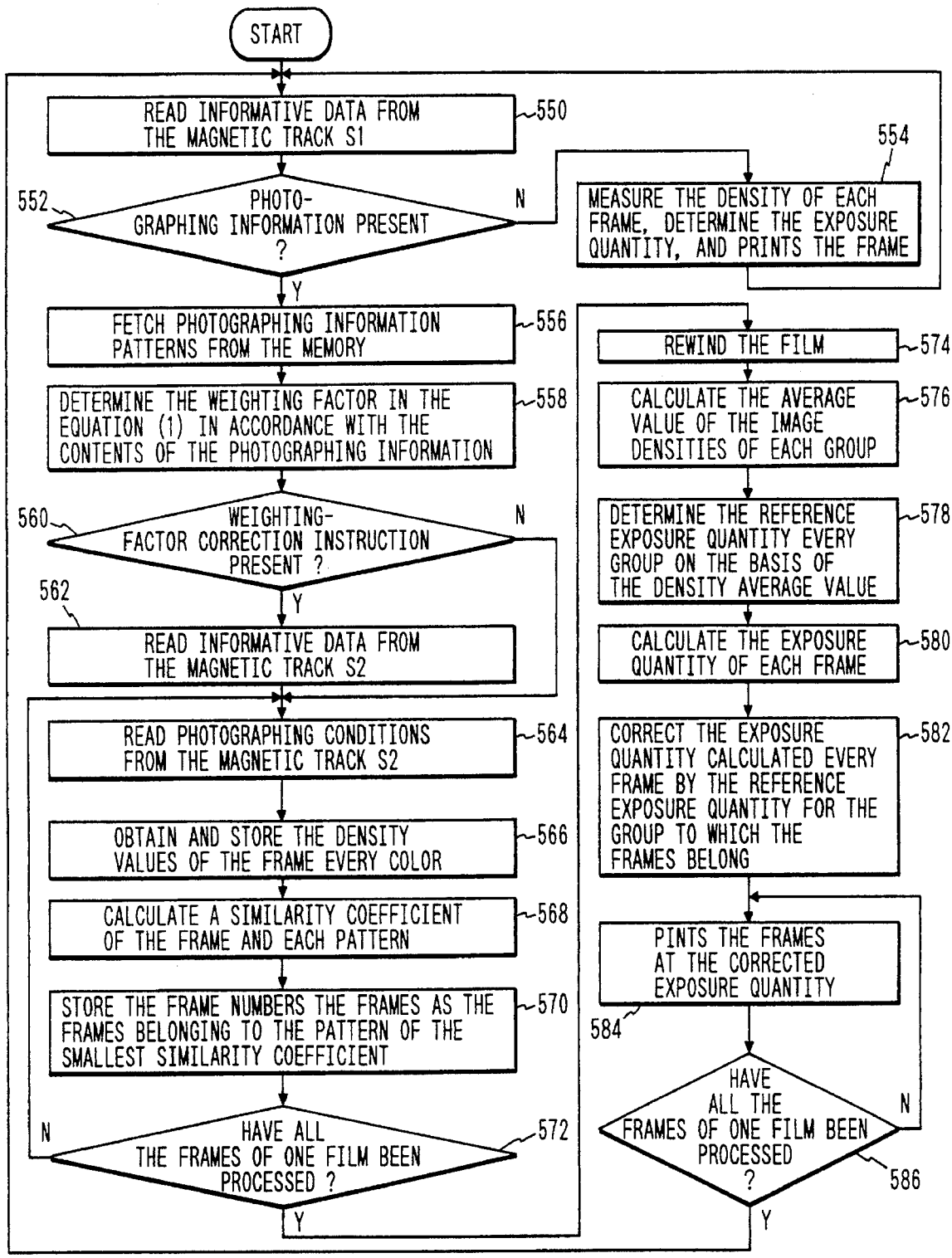
FIG. 4 is a flow chart showing the operation of a second embodiment of the present invention.

The operation of the second embodiment will be described with reference to FIG. 4. The process by a sequence of steps 550 to 554 in FIG. 4 corresponds to that by the steps 500 to 504 in the flow chart of FIG. 3. In the step 550, the head reads information from the magnetic track S1 of the negative film 50 every film. In a step 552, it is determined whether or not information including photographing information is recorded in the magnetic track S2, on the basis of the readout information of each film 50. If the answer to the step 552 is NO, the operation goes to the step 554 where the normal printing process is carried out for the frames 50A of one film. Upon completion of the printing process, the operation returns to the step 550.

If the answer to the step 552 is YES, the patterns of the photographing information are read out from the memory of the control unit 28. In steps 558 to 566, the operation is carried out, same as in the steps 506 to 114 in the FIG. 3 flow chart. Specifically, in the step 556, the items stored in the magnetic track S2 from items indicating the photographing information are recognized. Then, the weighting factor Ap is determined in the equation for similarity coefficient. In the step 558, it is determined if the instruction correcting the weighting factor is entered. If the answer to the step 558 is YES, the weighting factor is corrected in accordance with the instruction entered in the step 562.

In the step 564, the photographing information and the like are read out of one magnetic track S2, and the readout information is stored into a memory of the control unit 28. At the same time, the frame 50A is set at the printing position. In the next step 566, the photometric sensor measures the positioned frame 50A, and obtains the density values at the respective areas of the image for each of the colors R, G and B.

In the step 568, the control calculates a similarity coefficient Ghj with each photographing information to use the equation (1) on the basis of the photographing information read in the step 564 and the photographing information pattern fetched in the step 556. In a step 570, the pattern having the smallest similarity coefficient from photographing information patterns is determined and stored the frame number of the frame 50A corresponding to the pattern thus determined, as the frame belong to that frame group.

In a step 572, it is determined if all the frames 50A of one negative film 50 have been processed. If the answer to the step 572 is NO, the operation returns to the step 564, and repeats the sequence of the steps 564 to 572 until the answer to the step 572 is NO. As a result, the patterns to which the photographing conditions of all the frames 50A of the negative film 50 are equal or similar are recognized and described into each related group of frames.

If the answer to the step 572 is YES, the operation goes to a step 574. In the steps 574 to 580, the operation is carried out as in the steps 526 to 532 in FIG. 3. In the step 574 the negative film 50 is rewound until the first frame is placed outside, and in the step 576, the average value Dki of the density values of the frames 50A of each group is calculated. In the step 578, a reference exposure quantity Eki every group is calculated by the equation (3), using the average value Dki of each group. In the step 580, a print exposure quantity Eni of each frame 50A is calculated by using the print exposure quantity Eij stored in memory.

In the next step 582, the print exposure quantity Eij of each frame is corrected so as to approach to the reference exposure quantity Ekj belonging to each group, by use of the equation (4), so that the print exposure quantity Eij' after correction is obtained. In the next steps 584 and 586, the images of all the frames 40A of the negative film 50 are successively printed on the printing paper 26 at the print exposure quantity Eij' corrected in the step 582. The frames belonging to the same group, viz., the frames whose photographing conditions are decided to be equal or similar to the photographing conditions of a given pattern, are printed on the printing paper 26 at the print exposure quantities that are close (or equal) each other.

As described above, in the second embodiment, on the basis of the plural number of photographing information patterns and the photographing information of the frames, the frames are arranged into each group of the frames photographed under the photographing conditions equal to or similar to the photographing conditions included one of the photographing information patterns. There is a high probability that he group contains the frames of similar scenes. The frames belonging to the group are printed at similar or equal print exposure quantity. Therefore, the frames of similar scenes can be printed at the substantially equal finishing quality.

In the above mentioned embodiment, the photographing information is magnetically recorded in the film 50. It may be substituted by an optical record means, for example, a bar code. The recording media for recording the photographing information may be any other media than the negative film, for example, a memory card. In printing, the printer reads the photographing information from the memory card manually inserted thereinto.

In the embodiment mentioned above, the frames that are decided to have the equal or similar photographing conditions, are contained in one negative film. The frames of a plural number of negative films may be used for the same purpose.

In the embodiment, all the frames 50A of one film 50 are subjected to the above operations of reading the photographing information, photometric measuring, determining similarity, and rewarding the negative film 50, and finally the frames 50A are printed one by one. Alternatively, those frames may be subjected to the process one by one and printed similarly.

[Third Embodiment]

Figure 5:
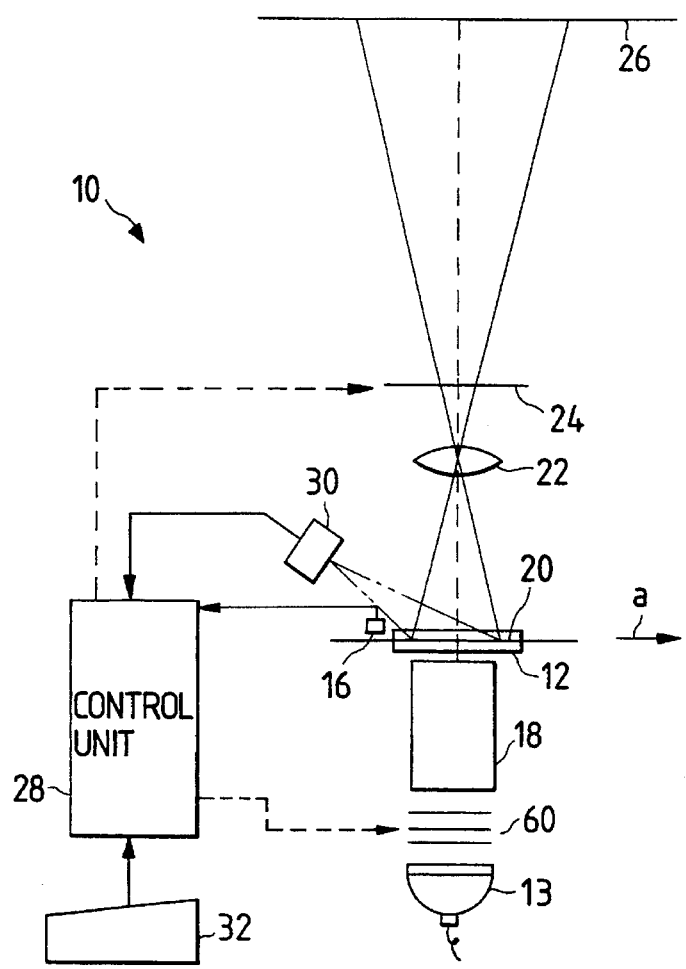
FIG. 5 is a schematic diagram showing a printer according to the third embodiment of the present invention.
Figure 6:
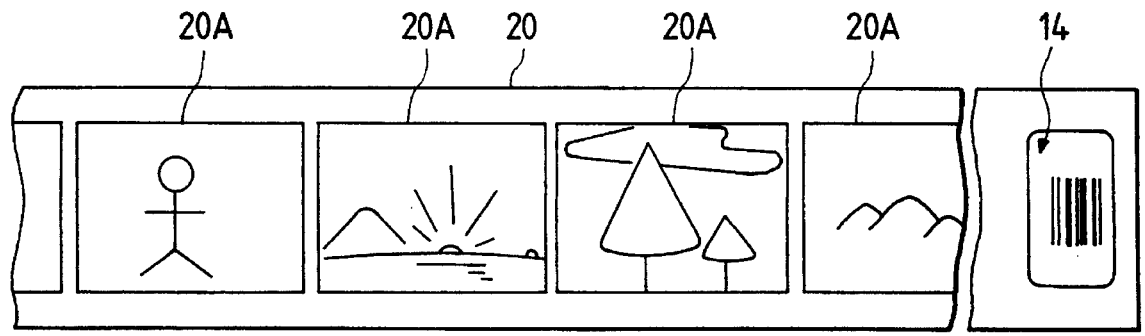
FIG. 6 is a plan view showing a negative film according to the third embodiment.
Figure 7:
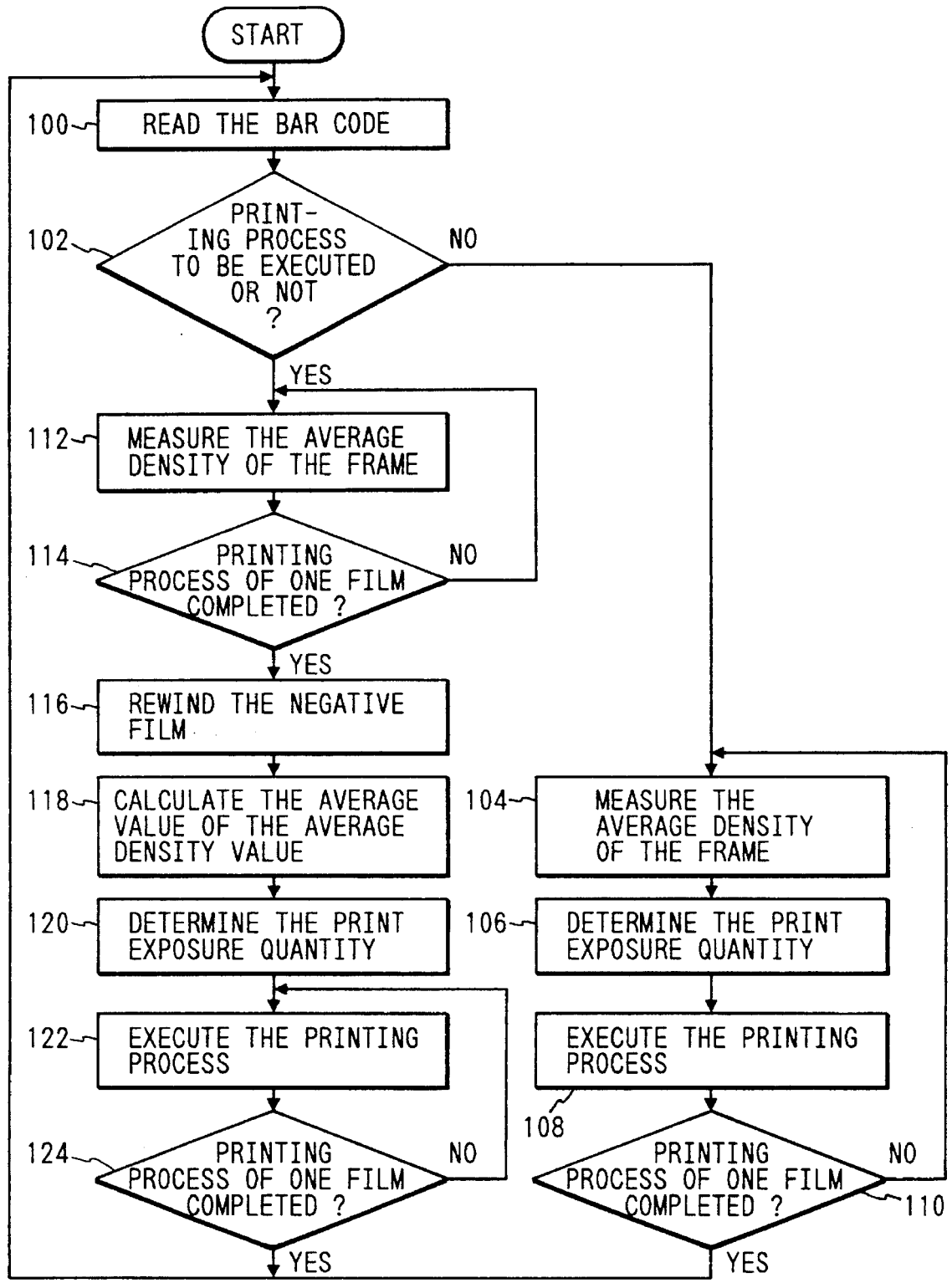
FIG. 7 is a flow chart showing the operation of the third embodiment.

A third embodiment of the present invention will be described with reference to FIGS. 5 through 7. Referring to FIG. 5, there is shown a printer 10 to which the present invention is applicable. The construction thereof is the same as that of the first embodiment except that a bar code reader 16 is used in lieu of the magnetic head 52 in the first embodiment.

A strip of negative film 20 bearing a plural number of frames 20A, photographed by a camera (not shown), is set to the printer 10 after the negative film 20 is subjected to a series of processes, development, bleaching, fixing, washing, and drying. A bar code 14 representing camera information, such as the type of camera used, is formed in the leading part of the negative film 20, as shown in FIG. 6. The camera information in the bar code 14 contains information indicating whether or not the images of the film were photographed by using a camera with the auto exposure function, a called AE (auto exposure) function, in the multi-pattern photometric method in which different areas on a subject to be photographed are measured by using a plural number of intensity measuring elements.

The information indicating whether or not the images of the film were photographed in the multi-pattern photometric method may be substituted by information indicating whether or not the images of the film were photographed in the called AF (auto focus) method after the exposure quantity is determined in the multi-pattern photometric method. Information to instruct the execution of the printing process at the print exposure quantity, which is determined on the basis of the print density adjustment exposure quantity for those frames 20A and the color balance adjustment exposure quantity for each of the frames 20A, may also be used. The AE function may be any of the stop first AE, the shutter-speed fist AE and the program AE. The AE camera may be categorized into two types of camera, a camera with the AF function, and a camera of the AE lock type in which exposure is automatically determined when the camera is focused on the major subject.

The bar code reader 16 for reading the bar code 14 of the film is disposed upstream (when viewed in the advancing direction of an arrow a of the film negative film 20) of the negative carrier 12. The image sensor 30 and the bar code reader 16 are connected to a control unit 28 containing a microcomputer and the related circuitry for controlling the printer. The control unit 28 is connected to a keyboard 32 for entering commands, data or the like. The control unit 28 is connected through drivers (not shown) to the lighting control filter 60 and the black shutter 24. The filter and the shutter are controlled by the control unit 28.

The operation of the third embodiment as mentioned above will be described with reference to FIG. 7. The flow chart of FIG. 7 will run when the negative film 20 is set to the printer 10 and a start instruction of the print process is entered.

In a step 100, the negative film 20 is transported, and the bar code reader 16 reads the bar code 14 recorded in the leading part of the negative film 20. In a step 102, it is determined whether or not a printing process of the invention is carried out, wherein the printing process of the invention (referred to frequently as "invention printing process") is carried out at the print exposure quantity based on the print density adjustment exposure quantity for those frames 20A and the color balance adjustment exposure quantity for each of the frames 20A. When detecting that the images of the negative film 20 to be printed were photographed in the multi-pattern photometric method by using the AE camera on the basis of camera information, the answer to the question of the step 102 is YES.

If the answer to the question of the step 102 is NO, the operation goes to a step 104. Through the steps 104 and 110, the normal printing process is carried out. To be more specific, in the step 104 the two-dimensional image sensor 30 measures the intensities of light from a number of segmental areas of each frame 20A, detects an integral transmission density of the entire surface of each frame, and obtains the average density of the entire image surface. In the step 106, the print exposure quantity for the frame 20A is calculated by use of the average density according to the following equation (5).

$$\text{Log } E_{ij} = S_j \{ C_j \cdot ad(d_{ij} - dw_{ij}) + (1-ad)dw_{ij}\} + ad \cdot (B) + K_j \quad (5)$$

where i=film frame number, j=any of the colors R, G and B (=1 to 3), $E_{ij}$=print exposure quantity, $S_j$=slope control value, $C_j$=color control value, $d_{ij}$=difference between the density of each frame 20A for each color and the corresponding density of the reference negative film (called a Bull's eye) ($d_{ij}-d_{nj}$), $dw_{ij}$=arithmetical mean density of the differences $d_{ij}$ of three colors (j=1 to 3) on the frame 20A ($\Sigma d_{ij}/3$), B=density control value determined by the plural number of frames, and $K_j$=constant, which depends on sensitive material and the device.

In the equation (5), the first and second right sides describe the color control, and the third right side describe the density control.

Further, ac and ad are parameters for the color control and the density control. The color and density controls are performed in the following ways.

ac=0: The color control is based on the constant value $K_j$.
ac≠0: The control is based on the film image density.
ad=0: The density control is based on the film image.
ad=1: The density control is based on the fixed condition value (B).

When the answer to the question of the step 102 is NO, the parameter ad to 0, i.e., ad=0 is set by the control unit 28. Accordingly, in determining the quantity of the print exposure light in the step 106, the color and the density are both controlled on the basis of the average density of each frame calculated in the step 104, by the equation (5).

In the next step 108, the images of the frames 20A are printed on the color paper 26 at the determined print exposure quantity. In a step 110, it is determined whether or not the printing process of one film has been completed. When the answer to the question of this step is NO, the operation returns to the step 104, and is performed repeatedly by the above steps. In the films of the type in which the images of the frames are photographed after the exposure is set up by any other method than the multi-pattern photometric method, for example, by a manual method, or the films photographed by low grade cameras not having the exposure adjustment function, the quantity of print exposure light is obtained every frame 20A of the films before the print process. If the answer to the question of the step 110 is YES, the control returns to the step 100.

If the answer to the step 102 is YES, a step 112 is performed so that the invention printing process is carried out. In the step 112, the two-dimensional image sensor 30 measures the intensity of a number of segmental areas of each frame for each color R, G and B, detects an integral transmission density of the entire surface of each frame, and obtains the average density of the entire image surface. Alternatively, the average density on the major part on the frame may be obtained. The major part of the frame may be the center area of the frame where a major subject is located highly probably or the focus area, for example.

In a step 114, it is determined whether or not the printing process of one film has been completed. When the answer to the question of this step is NO, the operation returns to the step 112, and repeats the sequence of the steps 112 and 114 until the frames 20A of the negative film 20 are all measured the intensity thereof. If the answer to the question of the step 114 is YES, the operation goes to a step 116 where the negative film 20 is rewound till the beginning of the film is placed to the outside. In the next step 118, an average value of the stored average density values of all the frames of the negative film 20 is calculated. In a step 120, the quantity of the print exposure light is determined using the equation (5).

In this case, ad (parameter)=1 is set up by the control unit 28 since the answer to the step 102 is YES. Accordingly, the equation (5) determines the print exposure quantity using a density adjustment exposure quantity, which is determined by a color adjustment exposure quantity based on the average density of each frame obtained in the step 112, the fixed condition value for all the frames of one negative film 20, and the average value of the average density values of the frames obtained in the step 118. In other words, the color is controlled in accordance with the average density values of the frames 20A obtained in the step 112, and the density is controlled in accordance with the average value of the average density values of the frames obtained in the step 118. Accordingly, a step 120 determines a print exposure quantity whose print density and color balance are optimized, by the equation (5).

In the next step 122, the printing process is carried out at the determined print exposure quantity $E_{ij}$. To be more specific, the frames 20A of the negative film 20 are set at the print position of the negative carrier 12, and the unexposed portion of the color paper 26 is set at the print position. The black shutter 24 is released to allow the rays of light, which are emitted from the lamp house 13 and pass through the lighting control filter 60, the mirror box 18 and the negative film 20, to be focused at the color paper 26. As a result, the images of the frames 20A are printed on the color paper 26. The lighting control filter 60 and the black shutter 24 are controlled so that the exposure quantities of the colors R, G and B are each equal to the print exposure quantity Eij.

In a step 124, it is determined whether or not the printing process for all the frames 20A of one film 20 has been completed. When the answer to the question of this step 124 is NO, the operation returns to the step 112, and repeats the above sequence of the steps. As a result, all the frames 20A of one film 20 are printed at the print exposure quantity Eij determined by the equation (5). If the answer to the step 124 is YES, the operation returns to the step 100, and repeats a similar process for the negative film 20.

As described above, in the first embodiment as mentioned above, when the negative film 20 photographed in the multi-pattern photometric method by the AE camera is printed, the average density on the entire surface of each frame 20A of the film 20 is measured, and the print exposure quantity Eij is obtained using the print density adjustment exposure quantity for the density control, which depends on the average value of the average density values of one negative film, the color balance adjustment exposure quantity for the color control, which depends on the frame surface average density of each frame 20A. Finally, the frames 20A of the negative film 20 are all printed at the print exposure quantity Eij. Accordingly, the print density adjustment exposure quantity takes a value based on the varied exposures of the cameras and the varied sensitivities of the films. The color balance adjustment exposure quantity is little influenced by various parameters, such as film type, film nonuniformity caused in the manufacturing stage, photographing light source, film aging, film characteristics caused by the storage of films, development nonuniformity, and the like, and takes a value based on the film image density of each frame. The print exposure quantity is determined in accordance with the varied exposures of the cameras and the varied sensitivities of the films, and contains the color balance of each frame as a factor to determine the print exposure quantity itself. Accordingly, the well color balanced prints of proper density values are produced at a high probability when the frame images of the film are printed at the print exposure quantity.

There are some cases a user intentionally controls the exposure of the camera in order to exactly reproduce high light, shadow or the like in the print. In this case, the present embodiment sufficiently satisfies such a user's intention.

The print exposure quantity may be determined in any other ways. For example, Dij (density of each frame for each color) of dij (density difference) in the equation (5) may be obtained from the results of measuring intensity of low saturation points, viz., the values obtained by the technique for removing high saturation points in the film images as disclosed in Japanese Patent Application Laid-Open Nos. Hei. 3-53234, 3-46648, 2-90140, Sho. 61-223731, and 61-198144.

In the embodiment as mentioned above, the invention print exposure quantity or the normal print exposure quantity is selected in accordance with the camera information recorded in the form of the bar code 14. Where the frames of one film measured are photographed at proper exposure, the print process selection as disclosed in Published Unexamined Japanese Patent Application No. Hei. 3-88458 may be additionally used. In this case, the equation (5) is used under the condition that ac=0 and ad=1.

Also in the embodiment, the bar code as information to select the invention print exposure quantity is automatically printed on the film by the camera at the time of photographing. The same may be set manually by a user or automatically or manually when the printer is operated.

The results of comparing the prints formed by the invention with the ones by the conventional technique will be described.

For the comparison, the following camera and the printer were used:

Camera: MINOLTA α-7000 (Trade name, manufactured by MINOLTA Corp., with the multi-pattern photometric AE function)

Printer: CHAMPION SUPER FA-250 (Trade name, manufactured by FUJI FILM Corp.)

A number of films photographed by the camera were developed, and set to the above printer. Three types of prints were made as follows:

a) The auto print based on the image density by the printer (Conventional method).

b) The fixed time print based on the camera exposure result by the printer (the conditions for the fixed time print conditions were determined using a number of frame prints by the try and error method) (conventional method).

c) The auto print by the printer. In the print, the print density was based on the camera exposure control result, and the color control was based on the image density. That is, the image density was used for only the color control, in addition the conditions of item (b) above (Invention method).

Further (d): in the case of (c), a correction quantity for the density control was manually input.

In the conventional methods of (a) and (c), different types of films and aged films are not used. The correction quantity for the density control in (d) was determined by a correction algorithm of the fixed time print conditions for the many frames print, which was previously prepared by using image feature quantities obtained from the film image density values.

The prints of which the density values are in excess of ±1 key (±1 key: 20% increase or decrease of the exposure quantity) with respect to the proper print density were treated as NG prints. The ratios of the NG prints to the formed prints were as in the following table.

| Print method | Density NG (%) | Color NG (%) | Total (%) |
|---|---|---|---|
| (a) | 7.9 | 0.9 | 8.8 |
| (b) | 5.7 | 3.5 | 9.2 |
| (c) | 5.7 | 0.8 | 6.5 |
| (d) | 4.3 | 0.9 | 5.2 |

As seen from the table, the prints produced by the printing methods (c) and (d) of the invention are almost best in both the density and color.

[Fourth Embodiment]

The fourth embodiment of the present invention will be described with reference to FIGS. 1, 2 and 8 through 11. In the description to follow, like or equivalent portions are designated by like reference numerals in the drawings used for the first embodiment description. The description will proceed placing emphasis on the characteristic construction of the second embodiment.

The operation of the second embodiment will be described using flow charts shown in FIGS. 8 to 11.

Figure 8:
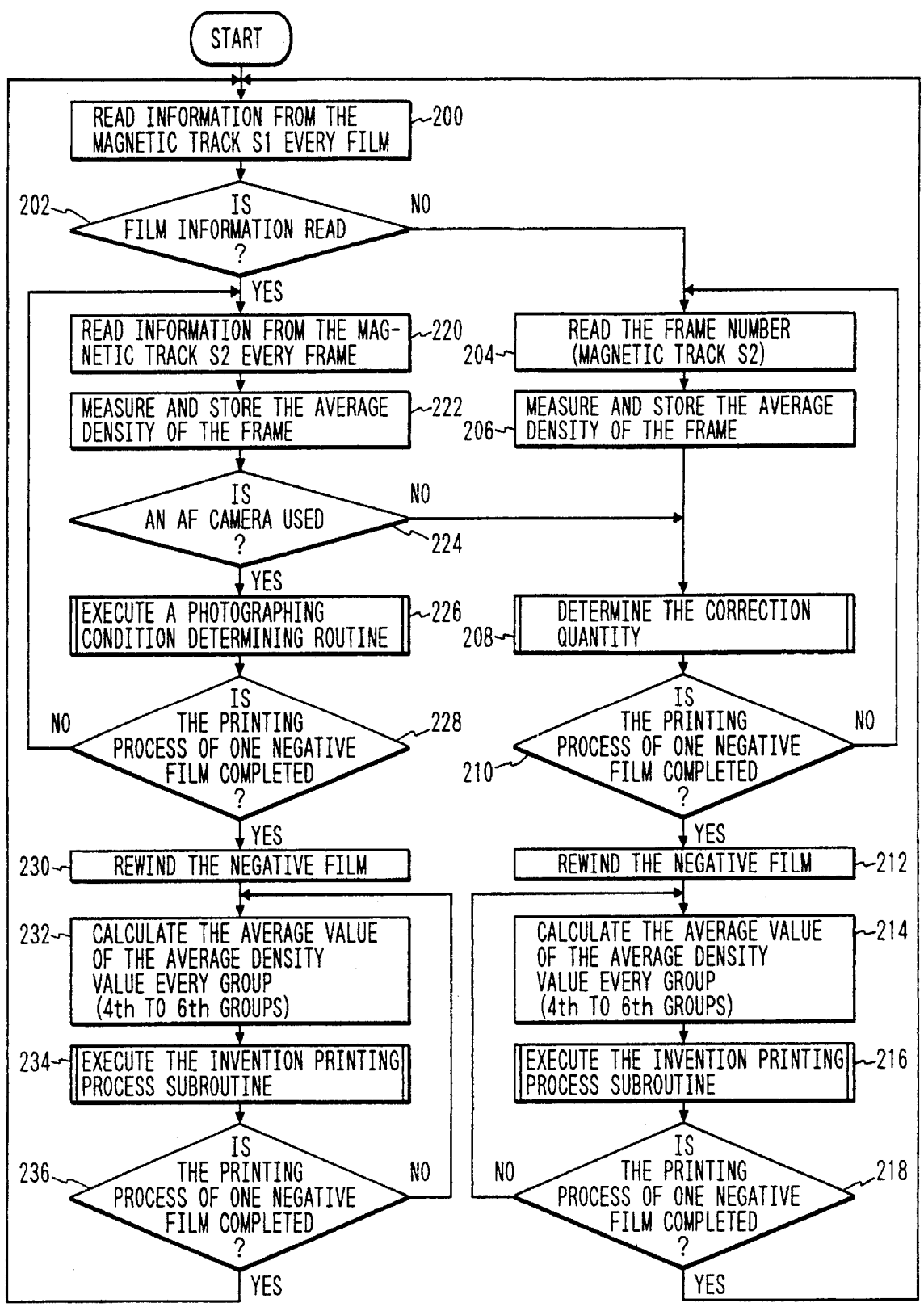
FIG. 8 is a flow chart showing the operation of the fourth embodiment.

In the flow chart of FIG. 8, in a step 200, the information of each film 50 are read out of the magnetic track S1. In a step 202, it is determined whether the information is read or not in the step 200.

If the answer to the question of the step 202 is NO, a step 204 is executed. In this step, the head 52 reads the frame number of the frame 5DA from the single magnetic track S2. In a step 206, the two-dimensional image sensor 30 measures the intensity of a number of segmental areas of each frame, and obtains the average density of the entire image surface of the frame for each of the primary colors R, G and B. The average density, together with the frame number that is read in the step 204, is stored. Alternatively, the average density on the major part of the frame may be obtained. The major part of the frame may be the center area of the frame where a major subject is located highly probably.

Figure 9:
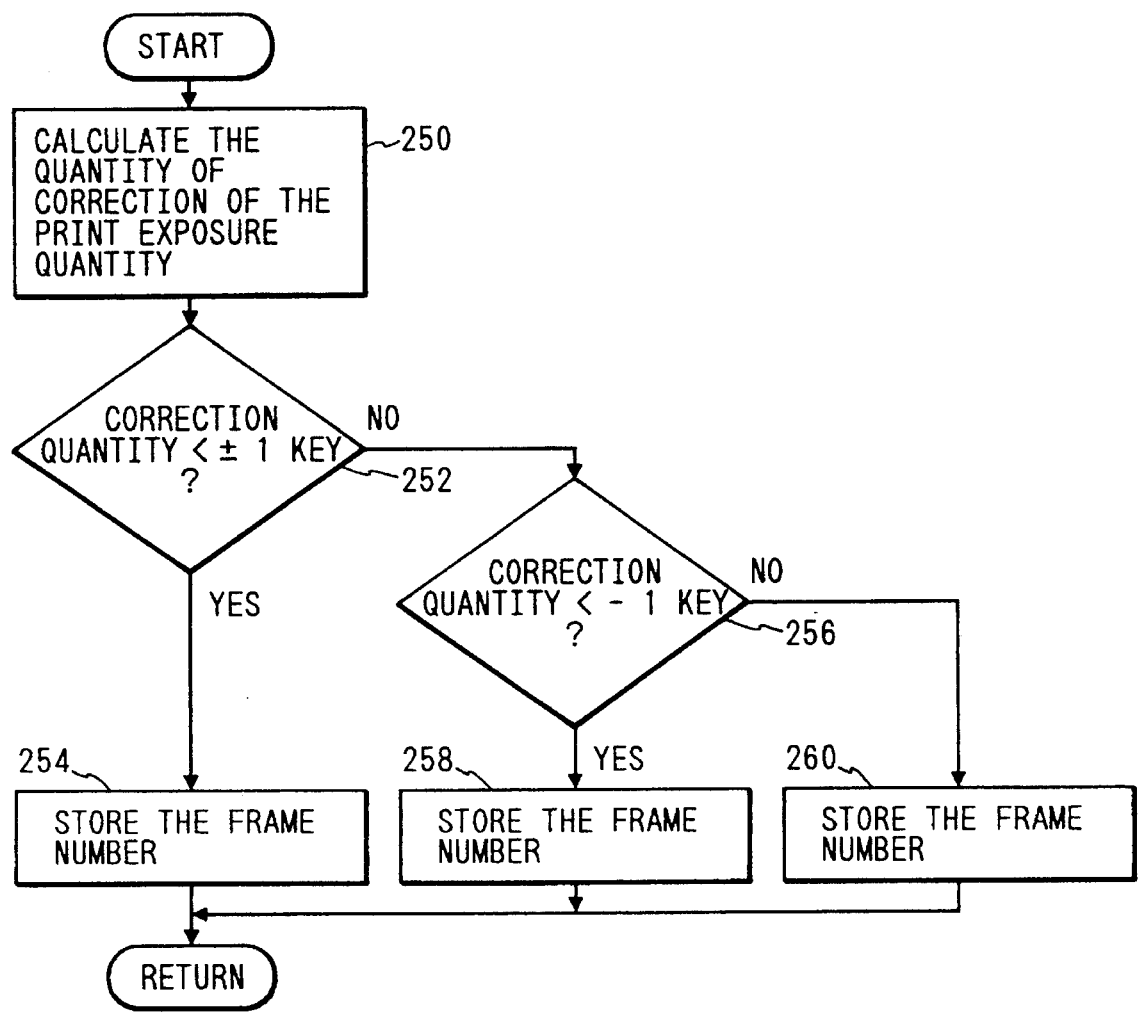
FIG. 9 is a flow chart showing the correction quantity determining subroutine in the flow chart of FIG. 8.

In a step 208, a correction quantity determining subroutine as flow charted in FIG. 9 is executed. In the correction quantity determining subroutine, a step 250 calculates a quantity of correction of the print exposure quantity of the frames 50A using the average density on the entire image surface measured in the step 206 according to the equation (5) (under the condition of ad=0), and in a step 252, it is determined whether or not the calculated correction quantity is within ±1 key.

If the answer to the question of the step 252 is YES, the frame number read in the step 254 is stored as the frame number of the frame belonging to a first group, in a step 254. The first group is a group of frames 50A photographed under the called forward light condition since the correction quantity is within ±1 key. Specifically, when the camera used has the exposure control function, it is can be considered that the exposure was proper. When the camera has not the exposure control function (or no exposure control is performed), the density of the major subject corresponds to that of the illumination state at the time of photographing. Accordingly, it can be considered that in either case, it is the group photographed under the condition of forward light if the correction quantity is within ±1 key.

If the answer to the step 252 is NO, the operation of a step 256 is proceeded, where it is determined if the correction quantity is smaller than −1 key. If the answer is YES, the frame number read in the step 204 is stored as the frame number of the frame belonging to a second group in a step 258. In the second group, the correction quantity is smaller than −1 key (larger than 1 in absolute value in minus). Accordingly, the second group is a group of frames 50A photographed under the called back-light condition. When the camera used has the exposure control function, the exposure tends to vary toward the underexposure. When the camera has not the exposure control function (or no exposure control is performed), the density of the major subject corresponds to that of the illumination state at the time of photographing. Accordingly, it can be considered that in either case, it is the group photographed under the back-light condition if the correction quantity is smaller than −1 key.

If the answer to the step 256 is NO, the frame number read in the step 204 is stored as the frame number of the frame belonging to a third group in a step 260. In the third group, the correction quantity is larger than −1 key. Hence, the third group is a group of frames 50A photographed under the called stroboscopic light condition. When the camera used has the auto stroboscopic function, the exposure tends to vary toward the overexposure. When the flash-matic illumination is used, the density of similar major subjects is used for the photographing of the same scene. When the camera has not the exposure control function, the density of the major subject corresponds to that of the illumination state at the time of photographing. Accordingly, it can be considered that in either case, it is the group photographed under the condition of stroboscopic light if the correction quantity is larger than 1 key.

After the correction quantity determining subroutine is executed, the operation returns to the main routine of FIG. 8, and in a step 210, it is determined whether or not the printing process of one negative film 50 is completed. If the answer to the step 210 is NO, the operation returns to the step 204. The operation repeats the sequence of the process steps 204 to 210 till the frame numbers of all of the frames 50A of the negative film 50 have been read, the average density values of the images has been measured, the correction quantity of the print exposure quantity have been checked, and the frames of the film have been grouped. When the answer to the step 210 is YES, the negative film 50 is rewound until the beginning of the film is placed to the outside.

In the next step 214, the average value of the average density values of the images of the frames 50A is calculated for each of the first, second and third groups, using the contents of the memory, and goes to a step 216 of a subroutine for the printing process of the invention.

Figure 10:
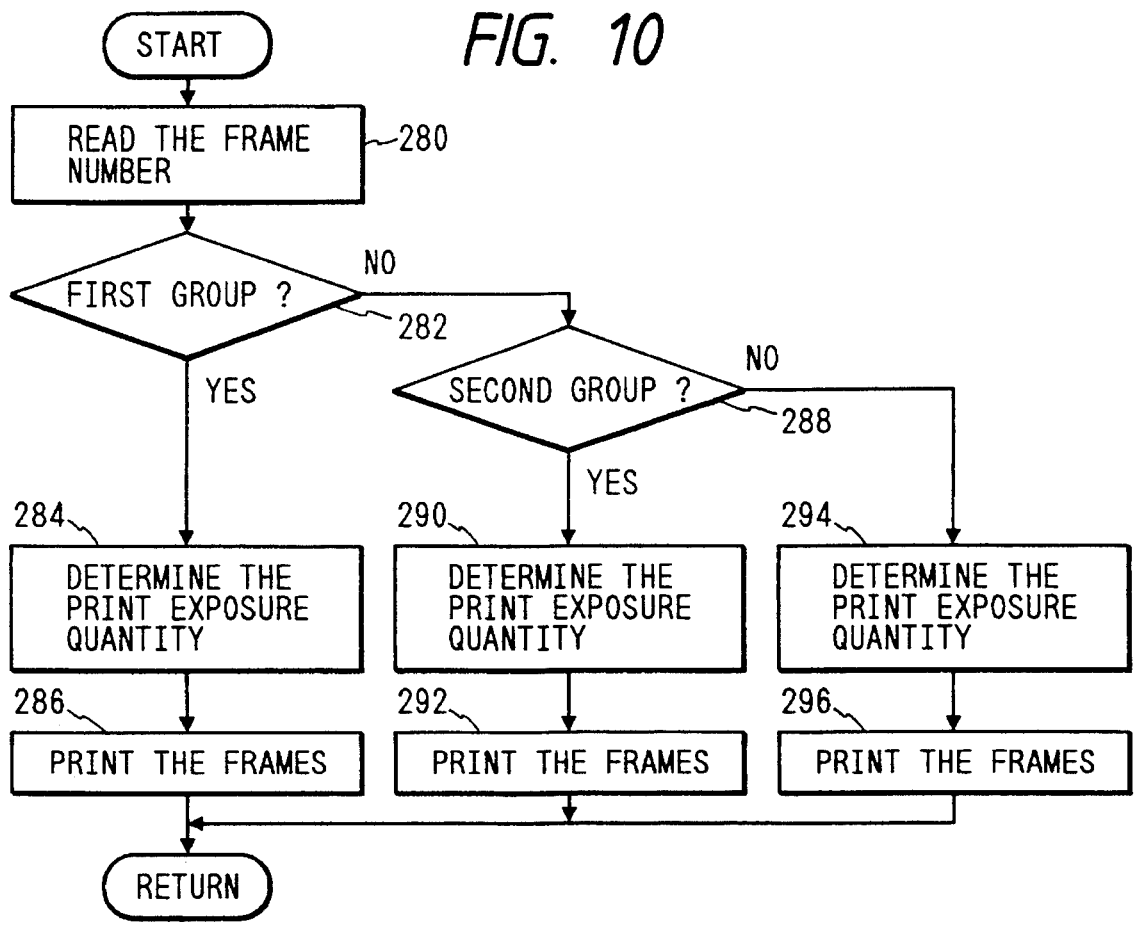
FIG. 10 is a flow chart showing the invention printing process subroutine in the flow chart of FIG. 8.

In the printing process routine of the invention, as shown in FIG. 10, in a step 280, the head 52 reads the frame number of the frame 50A from the single magnetic track S2. In a step 282, it is determined whether or not the frame 50A of the read frame number belongs to the first group. If the answer to the step 282 is YES, the operation goes to a step 284. In this step, the exposure quantity of the frame in the following way is determined. The average value of the average density values of the first group calculated in the step 214 is substituted for (B) in the equation (5) (where ad=1), and the average density of the frame 50A measured in the step 206 is substituted for the equation (5).

In a step 286, the frame 50A is printed at the print exposure quantity thus determined.

If the answer to the step 282 is NO, the operation goes to a step 288. In this step, it is determined whether or not the frame 50A which is read the frame number thereof in the step 280 belongs to the second group. If the answer to the step 288 is YES, in steps 290 and 292 the print exposure quantity of the frame 50A is determined and the frame thereof is printed as in the steps 284 and 286. In the process of determining the print exposure quantity in the step 290, the average value of the average density values of the second group, which is calculated in the step 214, is substituted for (B) in the equation (5) (where ad=1).

If the answer to the step 288 is NO, in steps 294 and 296 the print exposure quantity of the frame 50A is determined and the frame thereof is printed as in the steps 284 and 286. In the process of determining the print exposure quantity in the step 294, the average value of the average density values of the third group, which is calculated in the step 214, is substituted for the third term (B) on the right side of the equation (5) (where ad=1).

After the printing process subroutine of the invention is executed as the above, the operation returns to the main routine, and in a step 218 it is determined whether or not the printing process of one negative film 50 is completed. The operation repeats the sequence of the process steps 214, 216, and 218 until the answer to the step 218 is YES. If the answer to the step 218 is YES, the operation returns to the step 200, and a similar process is executed to the next negative film 50.

If the answer to the step 202 is YES, the operation of a step 220 is executed. In this step, the photographing conditions from one of magnetic track S2 is read. Further in a step 222, one frame 50A corresponding to the one of magnetic track S2 is measured photometrically and separately for a number of segmental areas of each frame, and the average density of the entire image surface of the frame for each of the primary colors R, G and B is obtained. The frame number and the photographing condition, that are read in the step 220, and the density values are stored in a correspondence fashion. Alternatively, the average density on the major part of the frame may be obtained. The major part of the frame may be identified to the focus area or the center area of the frame where a major subject is located highly probably.

In the next step 224, it is determined whether or not the camera used for photographing the images of the film has the auto focus function, on the basis of the information on the type of that camera which photographs the image that is read in the step 202. The reason of determination as to whether or not the camera for photographing the images of the film is used, is that the high exposure accuracy is provided in the camera having the auto focus function since the exposure is determined to depend mainly on the photometry of the main subject luminance. If the answer to the step 224 is NO, the step 208 is executed. In this step, the operation according to the case when the above-mentioned film information is not read is executed.

Figure 11:
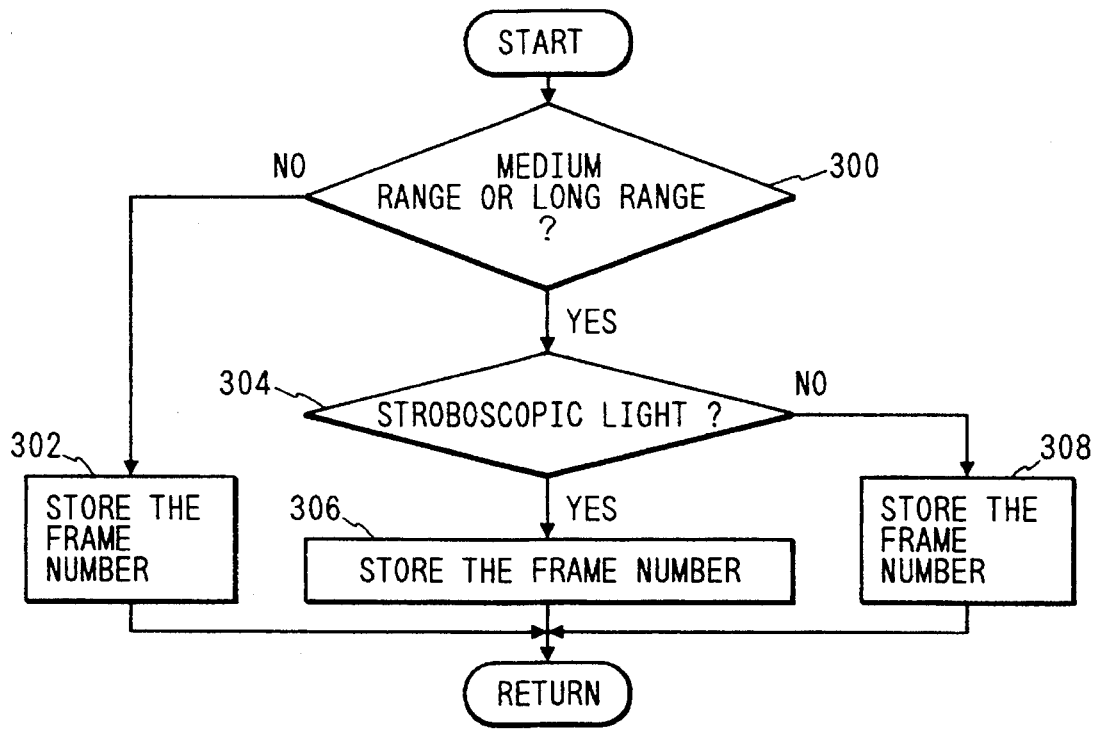
FIG. 11 is a flow chart showing the photographing condition determining subroutine in the flow chart of FIG. 8.

If the answer to the step 224 is YES, the operation of the step 226, this is a photographing condition determining subroutine, is executed as shown in FIG. 11. In this subroutine, in a step 300, it is determined whether or not a photometry for the photographing is performed at a medium range (about 10 m) or a long range on the basis of the photographing distance information which is read in the step 220. The operation determining the photometry distance, the medium range or the long range, is performed since the photometry accuracy is decreased in those ranges. If the answer to the step 300 is NO, the operation of a step 302 is executed. The frame number of the frame 50A that is read in a step 220 is stored as the frame number of the frame belonging to a fourth group.

If the answer to the step 300 is YES, the operation of a step 304 is executed. In this step, it is determined whether or not the image of the frame is photographed by the stroboscopic light on the basis of the information of the photographing light source that is read in step 220. The reason of determination as to whether or not the photographing is performed under the stroboscopic light is that when the stroboscopic information is present, and the medium range (about 10 m) or the long range is used for the photometry for the photographing, the photometry accuracy for the printing is decreased. If the answer to the step 304 is YES, in a step 306 the frame number of the image of the frame 50A is stored as the frame number of the frame belonging to a fifth group. If the answer to the step 304 is NO, the frame number is stored such that of the frame belonging to a sixth group.

After the photometry condition check subroutine has been executed, the operation returns to the main routine of FIG. 8. In a step 228, it is determined whether or not the printing process of one negative film 50 is completed. If the answer to the step 228 is NO, the operation returns to the step 220. The operation repeats the sequence of the process steps 220 to 228 until the all information of the frames 50A of the negative film 50 have been read every frame, the average density values of the image major part have been measured, the photographing conditions have been determined, and the frames of the film have been grouped. When the answer to the step 228 is YES, the negative film 50 is rewound till the beginning of the film is placed to the outside.

In the next step 232, the average value of the average density values on the entire image surface of the frame 50A of each of the groups (fourth to sixth groups) is calculated, on the basis of the stored contents, and then goes to an invention printing process subroutine in a step 234.

In the invention printing process subroutine, the print exposure quantity is determined, the frames 50A are printed at the determined print exposure quantity as in the printing procedure of the step 216. Following the above printing process subroutine of the invention, the operation returns to the main routine, and in a step 236, it is determined whether or not the printing treatment of one negative film 50 is completed. The operation repeats the sequence of process steps 232, 234, and 236 until the answer to the step 236 becomes YES. If the answer is YES, the operation returns to the step 200, and processes the next film 50 in a similar way.

As described above, in the fourth embodiment of the present invention, the plural number of frames 50A are arranged into a plural number of groups on the basis of the information representative of the calculated print exposure quantity or the photographing conditions that are read. The average density values of the entire image surface of each frame 50A are obtained for each group. The print exposure quantity for each frame 50A is determined on the basis both of the print density adjustment exposure quantity which is determined every group according to the average value of each group, and the color balance adjustment exposure quantity determined by the average density of the major portion on the image of each frame 50A. As the result, the print density adjustment exposure quantity depends on the vary of exposures of the cameras and the vary of sensitivities of the films, and is more appropriate than that in the case where the fames are not grouped. The color balance adjustment exposure quantity depends on the density of each frame 50A. The print exposure quantity which is determined on the basis of the print density adjustment exposure quantity and the color balance adjustment exposure quantity, is a value which is depended on the varied exposures of the cameras and the varied sensitivities of the films, to add factors of the color balance of each frame and the features of the same scene also serve into consideration determining the print exposure quantity. When the frames of the film are printed at the print exposure quantity thus determined, the prints most of which are well color balanced and proper in density can be produced for each group.

In grouping the frames into the fourth to sixth groups, the camera information that are recorded in the magnetic tracks S2 of the frames 50A and the features of the frames 50A obtained by the photometry process are taken into consideration. The grouping of these groups is more exact. In a case where the camera information is used, the frames may be grouped in accordance with the type of photographing light source, such as stroboscope, daylight, or fluorescent lamp, time zones the frames are photographed, seasons, or the combinations of those.

In grouping the frames every photographing conditions, the image displayed on the display screen may be taken into consideration. In this case, it is possible to determine whether or not the images of the frames are those of the same scene. The grouping work is more exact.

In the above-mentioned embodiment, the average value of the average density values on the entire image surfaces of all the frames of each group is used as it is as the print density adjustment exposure quantity of the group. Alternatively, the average value of the average density values on the entire image surfaces of a specific one frame or some specific frames of those of each group may be directly used as the print density adjustment exposure quantity of the group. In selecting the specific frame or frames, the camera information and/or the image on the display screen may be taken into consideration. The camera information or the image on the display screen ensures a reliable selection of specific frame or frames.

The average value of the print density determining exposure quantity of the specific frame or frames 50A of the second or third group may be corrected on the basis of the presumed exposure accuracy of the camera used. Specifically, a fixed quantity (minus) of correction is applied to the frames 50A of the second group photographed under the back-light condition. A fixed quantity (plus) of correction is applied to the frames 50A of the second group photographed under the stroboscopic light condition. Accordingly, most of the resultant prints are well color balanced and proper in density.

The following equation (6) may be used for determining the exposure quantity, in place of the equation (5) used in the third and fourth embodiments described above.

$$\log E_j = C_j + aD_j + bF_j + K_j \qquad (6)$$

where j (=1 to 3)=Any of colors R, G and B
$E_j$=Print exposure quantity
$C_j$=Exposure quantity for the color control based on the image data of the frame to be printed
$D_j$=Exposure quantity for the density control based on the image data of the frame to be printed
$F_j$=Difference between the density control of the selected frame or the average exposure quantity for the density control and the basic exposure quantity for the density control, that is, the corrected exposure quantity necessary for the film characteristic difference
$K_j$=Corrected exposure quantity determined by the exposure optical system, sensitive material and the like
a, b=constants for determining the ratio of $D_j$ and $F_j$. a<b and a+b=1.

Also when the equation (6) is used, the exposure quantity for color control is determined on the basis of the image data of the frame to be printed, and the exposure quantity for the density control is determined on the basis of the weighted mean of the image data of the frame to be printed and the image data of the selected frame (or the average exposure quantity of the selected frames). Accordingly, the prints that are well color balanced and proper in density can be produced at high probability.

In the third and fourth embodiments, information indicating whether or not the camera of the type which determines the exposure by measuring intensity of different areas on a subject by a plural number of intensity measuring elements is used for photographing the frames of the film is recorded in the form of the bar code 14 or on the magnetic tacks. The same information may be printed in a memory card, not the negative film, or a magazine for containing the negative film.

[Fifth Embodiment]

Figure 12:
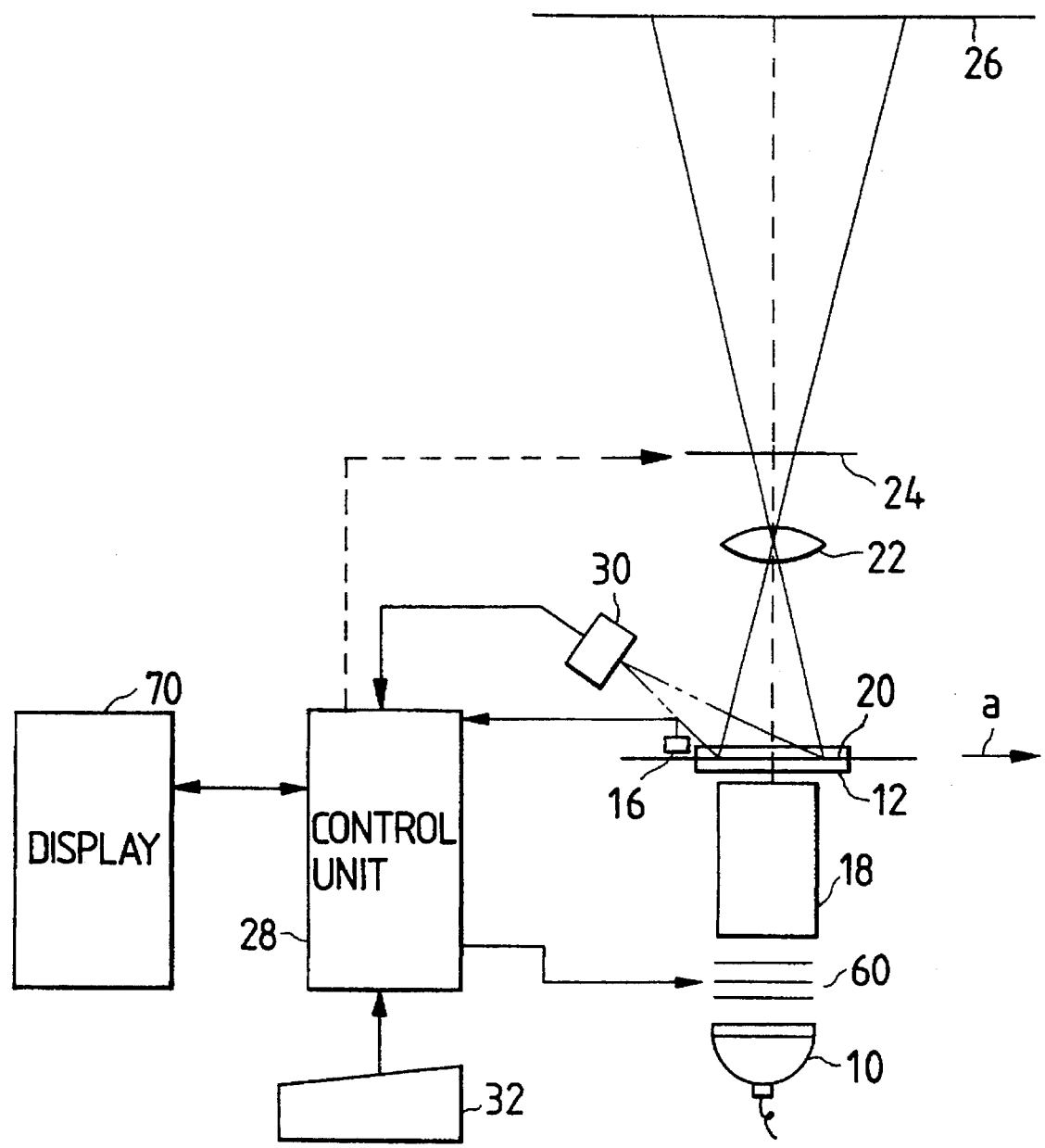
FIG. 12 is a schematic diagram showing a printer with a displace device according to the fifth embodiment of the present invention.
Figure 13:
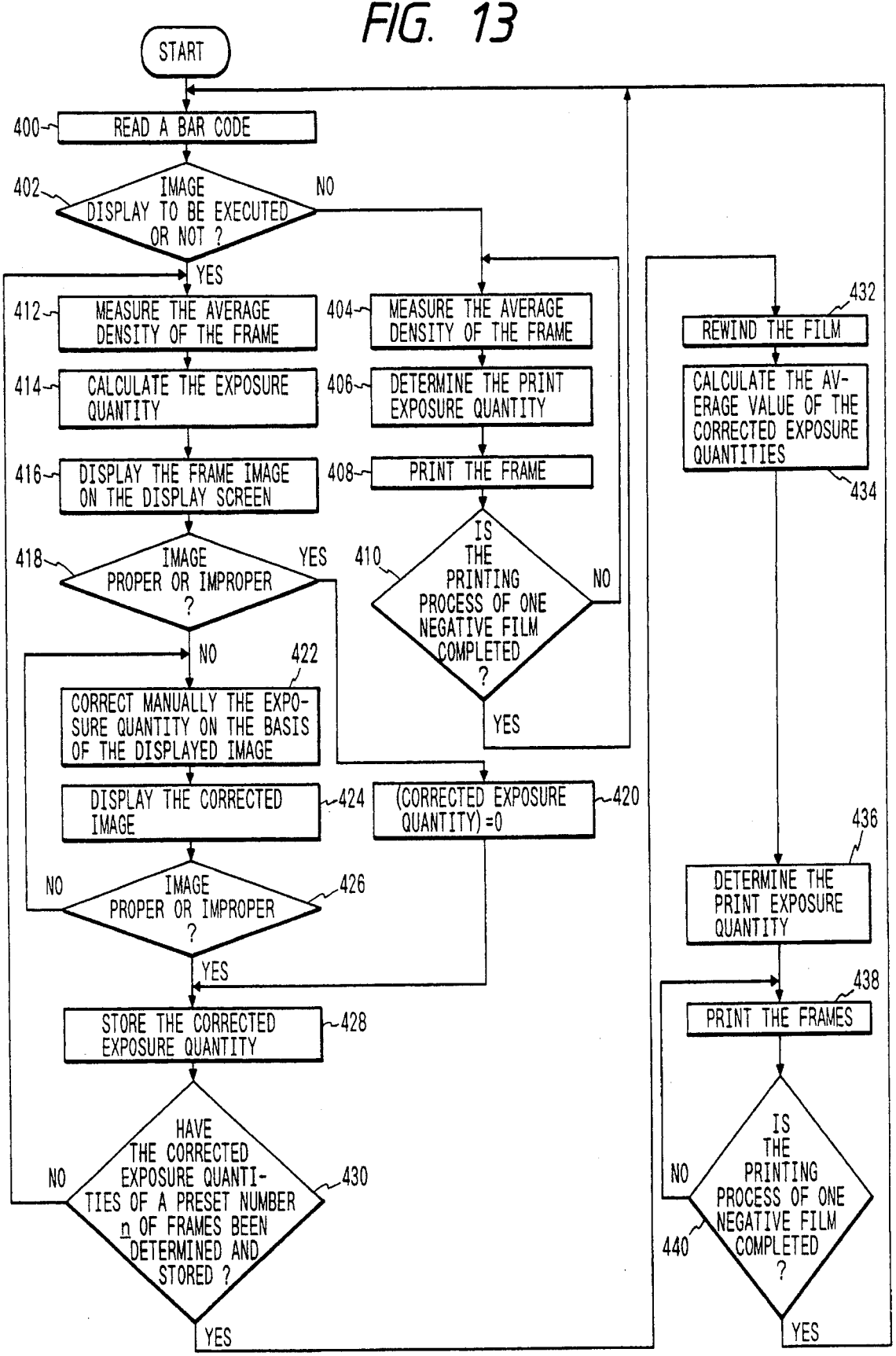
FIG. 13 is a flow chart showing the operation of the fifth embodiment.

The fifth embodiment of the present invention will be described with reference to FIGS. 12 and 13. In the description to follow, like or equivalent portions are designated by like reference numerals in the drawings used for the description of the third embodiment.

In the fifth embodiment, the construction thereof is the same as that of the third embodiment except that a display device 70 is coupled with the control unit 28. The display device 70 is controlled by the control unit 28 and feeds information necessary for the control unit 28 to the control unit.

The operation of the fifth embodiment will be described with reference to a flow chart shown in FIG. 13. The flow chart of FIG. 13 is started when the negative film 20 is set to the printer 10 and a start instruction of the print process is entered.

In a step 400, the negative film 20 is transported, and the bar code reader 16 reads the bar code 14 recorded in the leading part of the negative film 20. In a step 402, it is determined whether or not the image display by the display device 70 is to be executed. The answer to the question of the decision diamond of this step is YES when it is confirmed that the images of the negative film 20 to be printed were photographed in the multi-pattern photometric method by using the AE camera.

If the answer to the question of the step 402 is NO, the operation of a step 404 is executed. Through the sequence of steps 404 and 410, the normal printing process is carried out as in the steps 104 to 110. If the answer to the question of the step 402 is YES, the operation of a step 412 is executed. In this step, the two-dimensional image sensor 30 measures separately the intensities of light from a number of segmental areas of each frame 20A, and an average density of the entire surface of each frame for each of colors R, G and B is obtained and stored.

In the next step 414, the exposure quantity for the image display is determined according to the method for determining the exposure quantity including the print condition setting parameters by use of the image average density (LATD). The exposure quantity is determined for each of the colors R, G and B. In a step 416, the frame 20A is displayed on the display screen (not shown) of the display device 70. In this case, it is displayed as a positive image like a print that is formed at the determined exposure quantity. In a step 418, it is determined whether the density and the color control of the displayed image are proper or improper.

If the answer to the step 418 is YES, the corrected exposure quantity is set to zero (0) in a step 420 and stores 0 as the corrected exposure quantity in a step 428. If the answer to the step 418 is NO, the exposure quantity is adjusted by use of the display device 70 until the image density and the color control become proper, through the sequence of steps 422 to 426. In the step 422, the exposure quantity is manually adjusted using a keyboard 32. In the step 424, a positive image of the frame 20A, formed at the corrected exposure quantity, is displayed on the image screen of the display device 70. In the next step 426, it is determined whether the density and the color control of the displayed image are proper or improper. If the density and the color control of the displayed image are proper or improper, the sequence of the steps 422 to 426 is repeated until the answer to the step 426 become YES. If the answer to the step 426 is YES, the operation of a step 428 is executed where the corrected exposure quantity is stored.

In the next step 430, it is determined if the corrected exposure quantities of a preset number n of frames have been determined and stored (n: equal to or more than 1 or 2 but is smaller than the number of frames). If the answer to the step 430 is NO, the sequence of the steps 412 to 430 is repeated until the answer to the step 430 is YES. If the answer to the step 430 is YES, the operation of a step 432 is executed to rewind the negative film until the beginning of the film is reached. In the next step 434, the average value of the corrected exposure quantity which is stored in the step 428 is calculated and stored.

In a step 436, the print exposure quantity is determined according to the following equation (7).

$$\text{Log } E_j = B_j + FM_j + K_j \quad (7)$$

where j (=1 to 3)=Any of colors R, G and B
$E_j$=Print exposure quantity
$B_j$=Predetermined basic exposure quantity
$FM_j$=Corrected average exposure quantity of a plural number n of frames
$K_j$=Corrected exposure quantity determined by the exposure optical system, sensitive material and the like In the next step 438, the frames 20A are printed at the determined print exposure quantity, and in a step 440 it is determined whether or not the printing process of one negative film has been completed. If the answer to the step 440 is NO, the sequence of the steps 438 to 440 is repeated until the answer to the step 440 is YES. When the print of one negative film is completed and the answer to the step 440 is YES, the operation returns to the step 400, and executes a similar process of the next negative film 20.

As described above, in the fifth embodiment, the corrected average exposure quantity of a plural number n of frames is used as the corrected exposure quantity valid for all of the frames of a film. Since the corrected exposure quantity reflects on the determination of the print exposure quantity of the frames 20A, the exposure quantity can be exactly and efficiently corrected for parameters, such as camera type, film type, development, and film aging. When the frames of the film are printed at the determined exposure quantity, most of the resultant prints are well color balanced and proper in density. In the third embodiment, the print exposure quantity is determined using the first frame or several frames as counted from the first frame. The thus determined print exposure quantity is used for printing all of the frames of one film 20. Accordingly, the exposure quantity can be rapidly determined when it is determined by displaying the frames one by one on the display screen.

In the above-mentioned embodiment, only the first n number of frames are displayed. If required, n may be equal to the number of frames of one film. Accordingly, all of the frames are displayed. In this case, the exposure quantities corrected through the display of the frames may reflect on the respective frames. Alternatively, the average value of the corrected exposure quantities may reflect on the frame every time the exposure quantity is corrected. One or a plural number of frames may be displayed on the display screen of the display device 70. The display of the frame or frames by the display device 70 and the selection of the frames to determine the exposure quantity on the basis of the display results may be carried out manually or automatically.

The following equation (8) may be used for determining the exposure quantity, in place of the equation (7).

$$\text{Log } E_j = B_j + aFA_j + bFB_j + K_j \quad (8)$$

where j (=1 to 3)=Any of colors R, G and B
$E_j$=Print exposure quantity
$B_j$=Predetermined basic exposure quantity
$FA_j$=Corrected average exposure quantity of a number of films (sorted every camera type and film type)
$FB_j$=Corrected average exposure quantity of print films
$K_j$=Corrected exposure quantity determined by the exposure optical system, sensitive material and the like
a, b=coefficients as those in the equation (6) (e.g., a=0.4 and b=0.6).

Also using the equation (8), the exposure quantity can be exactly and efficiently corrected for parameters, such as camera type, film type, development, and film aging. When the frames of the film are printed at the determined exposure quantity, most of the resultant prints are well color balanced and proper in density.

As described in the first embodiments, photographing information indicating the photographing conditions of the photographed images is read out of the recording portion, and the images photographed under the equal or similar photographing conditions are printed under the equal or similar printing conditions, on the basis of the readout photographing information. Accordingly, the photograph printing method of the invention can print the photographed images of similar scenes so as to be substantially uniform in their finishing.

In the photograph printing method described in second embodiment, a plural number of photographing information patterns indicative of standard photographing conditions of the photographed frames are set up, photographing information is read out of the recording portion, and the images photographed under the equal or similar photographing conditions indicated by any of the photographing information patterns are printed under the equal or similar printing conditions, on the basis of the plural number of photographing information patterns and the readout photographing information of the frames. Accordingly, the photograph printing method of this invention can print the photographed images of similar scenes so as to be substantially uniform in their finishing.

What is claimed is:

1. A photograph printing method for printing on a photographic printing paper a plural number of images which are photographed on a film, said method comprising steps of:

detecting photographing information of said film;

determining frames of said film which have photographing conditions which are similar to one another by comparing said photographing information of said individual frames with one another;

determining similar print conditions corresponding to the similar photographing conditions of said frames thus determined; and printing said images in said frames using said similar print conditions thus determined;

wherein in said detecting step, photographing information is read out from recording positions of said film; and wherein in said frame determining step, a similarity coefficient of said photographic conditions of compared images is calculated by multiplying the square or the absolute value of the difference between the corresponding values of each item by a weighting factor predetermined for each item, summing the products of all of the items, and in a case that said similarity coefficient is equal to or smaller than a predetermined value, said compared images are determined to provide the similar photographing conditions as each other.

2. The method according to claim 1, wherein said photographing information includes at least one of the following items: photographing time, the luminance value obtained when different areas on a subject are measured the luminous quantities to determine an exposure, magnification, distance to a subject, subject in-focus position, stop, shutter speed, and use of stroboscopic light.

3. The method according to claim 1, wherein when, of those items of photographing information, there is at least one item not to be recorded a value thereof in the film, or when there is an instruction to remove a predetermined item from the factors for making a decision on the resemblance of the photographing conditions, the weighting factor for said one item or said predetermined item is set to 0 when calculating said similarity coefficient.

4. The method according to claim 1, wherein in said photographing information detecting step, in said images in said frames are measured luminous quantities, and in said print condition determining step, an average printing condition is determined for said plural number of images photographed under the similar photographing conditions.

5. The method according to claim 4, wherein printing conditions, which are obtained every image by a photometric measurement to said plural number of images, are modified by said average printing condition.

6. The method according to claim 1, wherein in said photographing information detecting step, said images in said frames are measured separately luminous quantities, and in said print condition determining step, a print exposure quantity is determined on the basis of at least one of, a print density adjustment exposure quantity for a predetermined frame of those belonging to a group consisting of said frames photographed under said similar photographing conditions, and an average value of the print density adjustment exposure quantities of said plural number of frames of those belonging to said group, and on the basis of a color balance adjustment exposure quantity which is determined every frame on the basis of said photometric values of said frames.

7. The method according to claim 6, wherein said predetermined frame or said plurality of frames are selected on the basis of camera information recorded on recording medium provided in association with said frames.

8. The method according to claim 6, wherein said predetermined frame or said plurality of frames are determined on the basis of a frame image displayed on a display screen of an image display device.

9. The method according to claim 6, wherein at least one of a print density determining exposure quantity determined for said predetermined frame and an average value of the print density adjustment exposure quantities determined for a plural number of frames of those belonging to a group of frames is corrected on the basis of a presumed exposure accuracy of a camera used.

10. A photograph printing method for printing on a photographic printing paper a plural number of images which are photographed on a film, said method comprising steps of:

detecting photographing information of said film;

determining frames of said film which have photographing conditions which are similar to one another by comparing said photographing information of said individual frames with one another;.

determining similar print conditions corresponding to the similar photographing conditions of said frames thus determined; and printing said images in said frames using said similar print conditions thus determined;

wherein in said detecting step, photographing information is read out from recording positions of said film;

wherein in said frame determining step, a plural number of photographing information patterns indicative of respective standard photographing conditions of the photographed frames are predetermined, the photographing information patterns having the corresponding print conditions, respectively, in which photographic information pattern corresponding to each frame is determined; and wherein in said frame determining step, a similarity coefficient of said photographing conditions of compared images is calculated by multiplying a square or absolute value of the difference between the corresponding values of each item by a weighting factor predetermined for each item, summing the products of all of the items, and in a case that said similarity coefficient is equal to or smaller than a predetermined value, said compared images are determined to provide the similar photographing conditions as each other.

11. The method according to claim 10, wherein said photographing information includes at least one of the following items: photographing time, the luminance value obtained when different areas on a subject are measured luminous quantities thereof to determine an exposure, magnification, distance to a subject, subject in-focus position, stop, shutter speed, and use of stroboscopic light.

12. The method according to claim 10, wherein when, of those items of photographing information, there is at least one item not to be recorded a value thereof in the film, or when there is an instruction to remove a predetermined item from the factors for making a decision on the resemblance of the photographing conditions, the weighting factor for said one item or said predetermined item is set to 0 when calculating said similarity coefficient.

* * * * *